(12) United States Patent
Goto et al.

(10) Patent No.: US 6,305,408 B1
(45) Date of Patent: Oct. 23, 2001

(54) FUEL TANK AND FUEL FEEDING APPARATUS USED THEREFOR

(75) Inventors: Hisatsugu Goto, Nisshin; Tomokazu Hori, Inazawa; Tomohide Aoki, Gifu-ken, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/491,977

(22) Filed: Jan. 27, 2000

(30) Foreign Application Priority Data

| Jan. 28, 1999 | (JP) | ................................................ | 11-019910 |
| Mar. 31, 1999 | (JP) | ................................................ | 11-091333 |
| Sep. 29, 1999 | (JP) | ................................................ | 11-275646 |
| Sep. 29, 1999 | (JP) | ................................................ | 11-277181 |
| Sep. 29, 1999 | (JP) | ................................................ | 11-277196 |
| Sep. 29, 1999 | (JP) | ................................................ | 11-277208 |

(51) Int. Cl.$^7$ ........................................................ F16K 24/00
(52) U.S. Cl. ........................ 137/351; 137/587; 137/588; 137/592
(58) Field of Search ........................................ 137/351, 587, 137/590, 592, 588

(56) References Cited

U.S. PATENT DOCUMENTS

| 4,573,694 | 3/1986 | Goto et al. | ............................ | 280/5 A |
| 5,660,206 | * 8/1997 | Neal et al. | ............................ | 137/592 |
| 5,772,062 | 6/1998 | Gramss | ................................ | 220/335 |
| 5,850,851 | 12/1998 | Miura et al. | ............................ | 137/583 |
| 6,148,849 | * 11/2000 | Green et al. | ............................ | 137/351 |

FOREIGN PATENT DOCUMENTS

| 0 955 199 A2 | 11/1999 | (EP) . |
| 2 761 974 | 10/1998 | (FR) . |
| 61044098 | 3/1986 | (JP) . |
| 3-57724 | 3/1991 | (JP) . |
| 3-57725 | 3/1991 | (JP) . |
| 11165545 | 6/1999 | (JP) . |

OTHER PUBLICATIONS

European Patent Office Search Report for Application No.: 00 101 576 dated Mar. 13, 2001.

* cited by examiner

*Primary Examiner*—A. Michael Chambers
(74) *Attorney, Agent, or Firm*—Pillsbury Winthrop LLP

(57) ABSTRACT

A fuel feeding mechanism of the present invention has an inlet filler pipe that runs from a filler opening formed in an outer side member of an automobile to a fuel tank. The inlet filler pipe has a flange. The inlet filler pipe is attached to an outer wheel house across a seal cup that is held between the flange of the inlet filler pipe and the outer wheel house. The inlet filler pipe is inserted from outside of the automobile through the filler opening toward the fuel tank and is attached to the outer wheel house. This arrangement enhances workability.

17 Claims, 29 Drawing Sheets

FUEL TANK AND FUEL FEEDING APPARATUS USED THEREFOR

BACKGROUND OF THE INVENTION

1. Field of the Invention

The present invention relates to a fuel feeding mechanism that connects a filler opening formed in an outside plate of a vehicle with a fuel tank and leads a supply of fuel to the fuel tank.

2. Description of Related Art

FIG. 41 shows a prior art fuel feeding mechanism FS for feeding a supply of fuel into a fuel tank of an automobile (not shown). The fuel feeding mechanism FS connects a fuel inlet unit attached to an outer side member 210, which is a constituent of an outside plate of a vehicle, to the fuel tank. The fuel feeding mechanism FS includes an inlet filler pipe 220 attached to the end of the fuel inlet unit and a hose (not shown) connecting with the inlet filler pipe 220. While a filler cap FC is removed, a supply of fuel is fed from a filler gun (not shown) into the inlet filler pipe 220. One end of the inlet filler pipe 220 is attached to the outer wheel house 230, which faces the outer side member 210 across a predetermined space. An electric system is laid in the space between the outer side member 210 and the outer wheel house 230. There is a closed lower space defined by the outer side member 210 and the outer wheel house 230. The fuel feeding mechanism FS has a seal cup 240. A seal end 241 extends from one end of the seal cup 240 and is press fit in a support recess 221 of the inlet filler pipe 220. The seal cup 240 prevents water trapped in the space between the outer side member 210 and the outer wheel house 230 from damaging the electric system and causing rust.

In this prior art structure, at the bottom of the seal cup 240, an opening peripheral part of the outer wheel house 230 is press fit into a fixation recess 242a, and a fixation ring 251 is inserted into a ring recess 242b. At the opening of the seal cup 240, an opening peripheral part of the outer side member 210 is press fit into a fixation recess 244a, and a fixation ring 252 is inserted into a ring recess 244b. This enables the inlet filler pipe 220 to be attached to the vehicle body.

The prior art technique carries out the attachment work of the fuel feeding mechanism FS at the bottom of the vehicle, and thereby has poor workability.

SUMMARY OF THE INVENTION

The object of the present invention is to provide a fuel feeding mechanism that facilitates attachment of an inlet filler pipe through which a supply of fuel is fed into a fuel tank.

At least part of the above and other related objects are attained by a fuel feeding apparatus that connects a filler opening arranged in an outside plate of a vehicle and a tank main body of a fuel tank and leads a supply of fuel to the tank main body. The fuel feeding apparatus includes an inlet filler pipe that has a pipe main body inserted from outside of the vehicle through the filler opening towards the tank main body and a pipe attachment secured to the pipe main body. The pipe attachment is detachably attached to a body attachment member disposed inside the outside plate.

The fuel feeding apparatus of the present invention connects the filler opening formed in the outside plate of the vehicle with the tank main body to lead a supply of fuel to the tank main body. The fuel feeding apparatus is attached to the vehicle by inserting the inlet filler pipe from outside of the vehicle through the filler opening toward the tank main body and attaching a pipe attachment of the inlet filler pipe to a body attachment member disposed inside the outside plate. This arrangement enables the inlet filler pipe to be attached to the vehicle from the outside of the vehicle through the filler opening of the outside plate. This does not require the attachment work at the bottom of the vehicle body unlike the prior art technique, and thereby has excellent workability.

In accordance with one embodiment of the present invention, the fuel feeding apparatus further includes a seal cup that seals the vicinity of a flow inlet of the inlet filler pipe. The seal cup has an opening and a cup bottom, wherein the opening of the seal cup is attached to the outside plate of the vehicle to surround the filler opening and the cup bottom of the seal cup has a hole through which the inlet filler pipe passes. A peripheral part of the cup bottom of the seal cup is held between the body attachment member and the pipe attachment to be attached to the body attachment member.

This arrangement obtains a seal in the vicinity of the flow inlet of the inlet filler pipe, simultaneously with the attachment of the seal cup to the body attachment member. The cup bottom of the seal cup also functions as a sealing member to seal the pipe attachment of the inlet filler pipe against the body attachment member. This arrangement does not require any separate sealing member for this purpose and thus simplifies the structure of the fuel feeding apparatus.

In accordance with another embodiment of the present invention, the pipe attachment is linked with the body attachment member with a clip that is elastically deformable. This arrangement enables the quick attachment of the inlet filler pipe to the body attachment member and thereby improves the workability.

In the above embodiment, linking the pipe attachment with the body attachment member by the clip may be released to prevent part of the inlet filler pipe from being broken, when a load of not less than a predetermined level is applied to separate the pipe attachment from the body attachment member. Even when a large external force is applied to the vehicle attachment member, for example, due to a sideways fall of the vehicle, this configuration effectively reduces the external force applied to the inlet filler pipe. Other methods to release the link between the body attachment member and the pipe attachment include for example, breaking the clip or elastically deforming the clip.

As another embodiment for attaching the pipe attachment to the body attachment member, the pipe attachment may have an engagement element that is rotated at a predetermined angle relative to the body attachment member to be attached to the body attachment member. This arrangement also enables quick attachment without any special tools.

In accordance with another embodiment of the present invention, the inlet filler pipe has a volume resistivity that enables conduction of static electricity and is connected to ground.

In this application, since the inlet filler pipe is made of a conductive material having a volume resistivity that enables conduction of static electricity, possible accumulation of static electricity during the flow of fuel through the inlet filler pipe during fuel supply is quickly eliminated by grounding. This does not require wiring to ground to ensure grounding of the inlet filler pipe and thereby simplifies the structure of the fuel feeding apparatus.

In accordance with still another embodiment of the present invention, a support member is mounted on the inlet filler pipe from the outside thereof, prior to the attachment of the fuel feeding apparatus to the vehicle. The inlet filler pipe forms a fuel conduit running from the filler opening to the tank main body. Part of the fuel conduit where the support member is mounted forms a curved portion that runs along a curved locus, which is defined by the shape of the support member. The shape of the support member is designed according to the positional relationship between the filler opening and the tank main body. This arrangement enables the fuel conduit having the curved locus according to the positional relationship between the filler opening and the tank main body to be formed by the simple attachment of the support member to the inlet filler pipe. This configuration does not require any special skills for the attachment of the fuel feeding apparatus to the vehicle and facilitates the attachment. The support member also absorbs a possible shock applied externally.

In one embodiment, the inlet filler pipe with the support member attached thereto is inserted from the outside of the vehicle through the filler opening toward the tank main body. This configuration enables the inlet filler pipe to be attached to the vehicle from the outside of the vehicle through the filler opening formed in the outside plate of the vehicle. This does not require the attachment work of the inlet filler pipe at the bottom of the vehicle and thereby enhances workability.

The support member may be constructed as a protector that protects part of the inlet filler pipe, or may be made of a flame-proof material. This arrangement enables the support member to protect the inlet filler pipe or have flame-proof properties.

The present invention is also directed to a fuel tank, which includes a tank main body, an inlet filler pipe through which a supply of fuel is fed to the tank main body, and a check valve that connects the tank main body with the inlet filler pipe to prevent liquid fuel and fuel vapor in the tank main body from being released to outside via the inlet filler pipe. The check valve is set in an open position in response to a supply of fuel into the inlet filler pipe to lead the supply of fuel into the tank main body. The tank main body has a valve attachment, which is disposed outside the tank main body and includes a passage through which the supply of fuel is led into the tank main body, and a tank engagement element disposed on the valve attachment. The check valve includes a casing with a discharge outlet that connects with the inlet filler pipe to enable the supply of fuel to be fed into the tank main body; a valve disc that opens the discharge outlet under application of a fuel supply pressure of not less than a predetermined level; and a valve engagement element that is formed on the casing and engages with the tank engagement element when the casing is attached to the valve attachment. The fuel tank further includes a seal that seals the casing against the tank main body.

The check valve is interposed between the tank main body and the inlet filler pipe, and is set to an open position in response to a supply of fuel into the inlet filler pipe to lead the supply of fuel into the tank main body. The valve disc of the check valve is otherwise kept in a closed position in order to block the flow in the fuel conduit and prevent the liquid fuel and fuel vapor inside the tank main body from flowing back and being released to the outside.

The check valve is attached to the tank main body by attaching the casing of the check valve to the tank main body from the outside thereof and making the valve engagement element formed on the casing of the check valve engage with the tank engagement element formed on the valve attachment. The check valve attached to the tank main body connects the inlet filler pipe with the tank main body. The engagement of the valve engagement element of the casing with the tank engagement element of the tank main body assures the secure attachment of the check valve to the tank main body. The seal is interposed between the tank main body and the casing of the check valve to seal the tank main body from the outside.

The structure of the present invention enables the check valve to be attached to the tank main body from the outside thereof. The structure is accordingly applicable to even non-splittable tank main bodies, for example, a blow-molded, integral tank main body made of a resin.

The structure of the present invention enables the attachment work of the check valve to be carried out after the coating and welding of the tank main body from the outside thereof. It is thus not required to apply the heat resistant material for the check valve. This desirably increases the possible range of selection of the material and thereby reduces the manufacturing cost.

In accordance with one embodiment of the fuel tank, the seal is interposed between the casing and the valve attachment to seal the tank main body from the outside. This arrangement further improves the sealing properties. The seal may have any configuration as long as it is interposed between the check valve and the valve attachment to seal the tank main body from the outside. For example, the seal may be arranged on either one or both of an inner circumferential part and an outer circumferential part of the valve attachment. The seal may be incorporated in the check valve, or alternatively, be constructed as a separate member. The seal may be formed integrally with the valve attachment and the casing, or the valve attachment and the casing may be formed integrally of a flexible resin.

In accordance with another embodiment of the fuel tank, the inlet filler pipe and the casing of the check valve are integrally formed of a resin material. This configuration does not require any rubber hoses or seals to connect the inlet filler pipe with the check valve, and accordingly reduces the required number of parts. The inlet filler pipe made of resin has a lower fuel (gasoline) permeability than the inlet filler pipe made of rubber.

The tank engagement element and the valve engagement element may have any structure as long as these elements engage with each other to prevent the check valve from slipping off the tank main body. For example, the tank engagement element and the valve engagement element may, respectively, be integrated with the valve attachment of the tank main body and the casing of the check valve, or alternatively, be constructed as separate elements.

In accordance with still another embodiment of the fuel tank, the casing includes a first casing section and a second casing section, which are separate elements but are capable of being integrated with each other. The valve attachment is disposed on the first casing section and the valve disc is disposed on the second casing section. In the case where the shape of the valve disc is varied according to the shape of the tank main body, this arrangement does not require a variation in total structure of the check valve, but only a variation in shape of the second casing section with the valve disc. This does not require a new mold for the whole check valve, and thus, simplifies the manufacturing process.

These and other objects, features, aspects, and advantages of the present invention will become more apparent from the following detailed description of the preferred embodiments with the accompanying drawings.

DESCRIPTION OF THE CURRENTLY PREFERRED EMBODIMENTS OF THE PRESENT INVENTION

Figure 1:
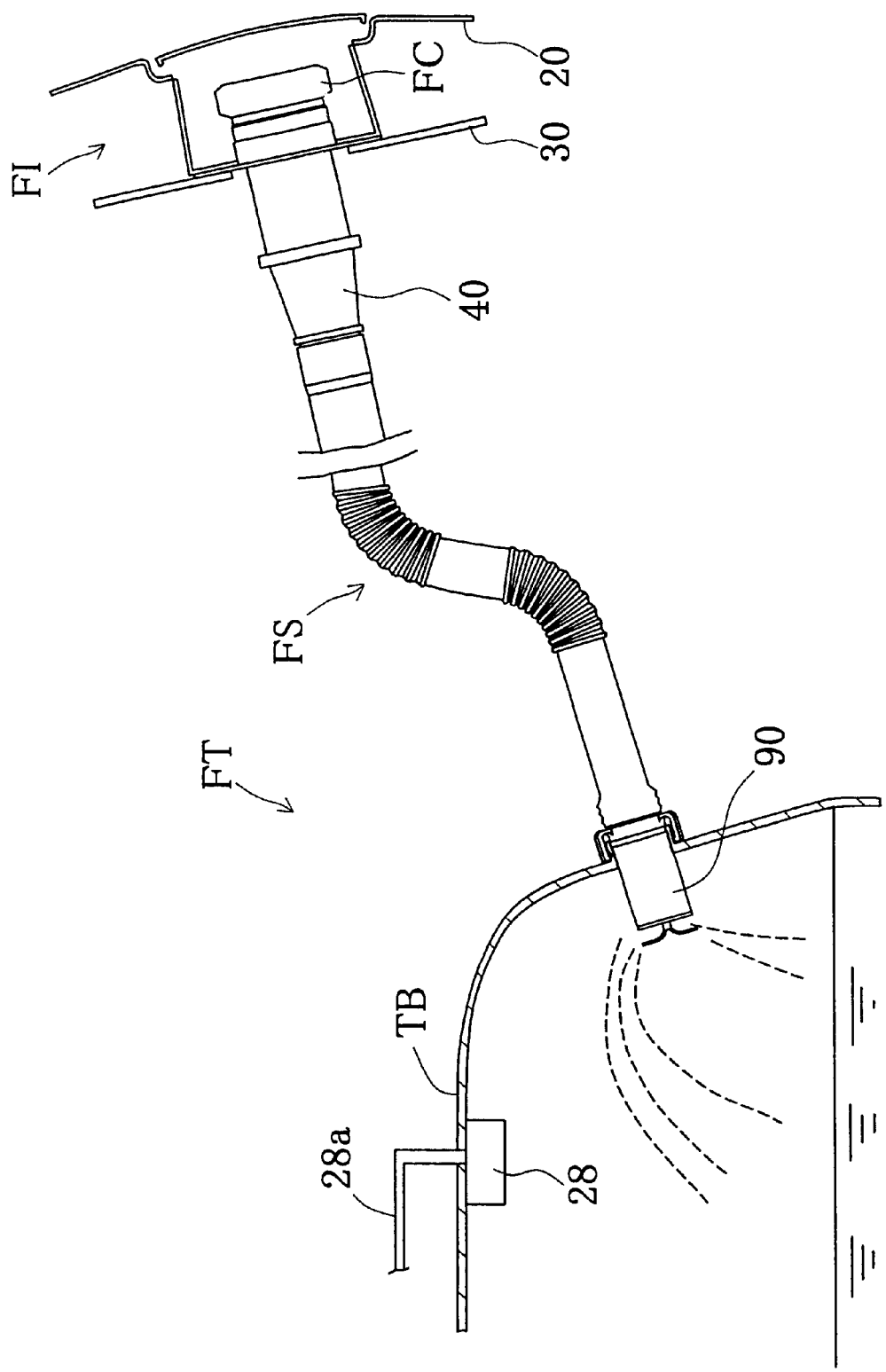
FIG. 1 schematically illustrates a fuel tank incorporated in an automobile.

FIG. 1 schematically illustrates a fuel tank FT incorporated in an automobile. The fuel tank FT includes a tank main body TB and a fuel feeding mechanism FS that is used to feed a supply of fuel into the tank main body TB. The tank main body TB is an integral tank that is made of a resin material (high-density polyethylene) and formed by blow molding. A fuel cut-off valve 28 is attached to an upper portion of the tank main body TB. The fuel cut-off valve 28 is connected to a canister (not shown) via a conduit 28a.

Figure 2:
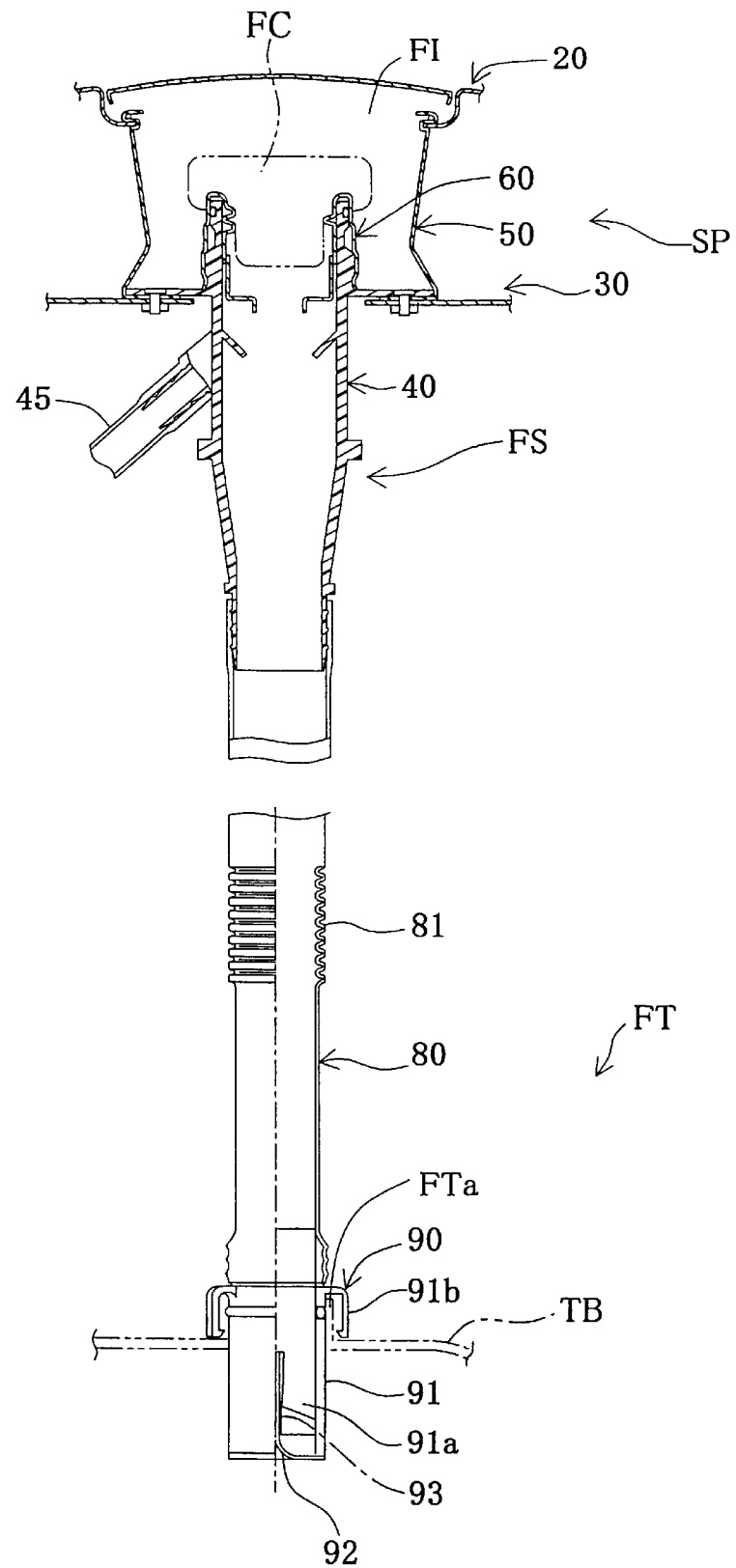
FIG. 2 is a partly broken sectional view illustrating a fuel feeding mechanism for feeding a supply of fuel to the fuel tank of the automobile in a first embodiment according to the present invention.

FIG. 2 is a partly broken sectional view illustrating the fuel feeding mechanism FS for feeding a supply of fuel to the tank main body TB of the automobile in a first embodiment according to the present invention. The fuel feeding mechanism FS connects a fuel inlet unit FI, which is attached to an outer side member 20 (a constituent of an outside plate of the vehicle) and an outer wheel house 30 (a member on the vehicle body), with the tank main body TB. The fuel feeding mechanism FS includes a filler cap FC, an inlet filler pipe 40, a seal cup 50, a connector 60, a connection pipe 80, and a check valve 90. A space SP between the outer side member 20 and the outer wheel house 30, that is, a part of the outer wheel house 30 in the vicinity of the filler cap FC, is sealed with the seal cup 50.

When the user opens the filler cap FC and feeds a supply of fuel from a filler gun (not shown) into the inlet filler pipe 40, the supply of fuel flows through the inlet filler pipe 40 and the connection pipe 80 to the check valve 90 and presses open the check valve 90 to be fed into the tank main body TB (not shown). The check valve 90 is set in an open position during fueling and is otherwise kept in a closed position. The check valve 90 effectively prevents liquid fuel and fuel vapors in the tank main body TB from flowing back and being released to the atmosphere, while the filler cap FC is open.

Figure 3:
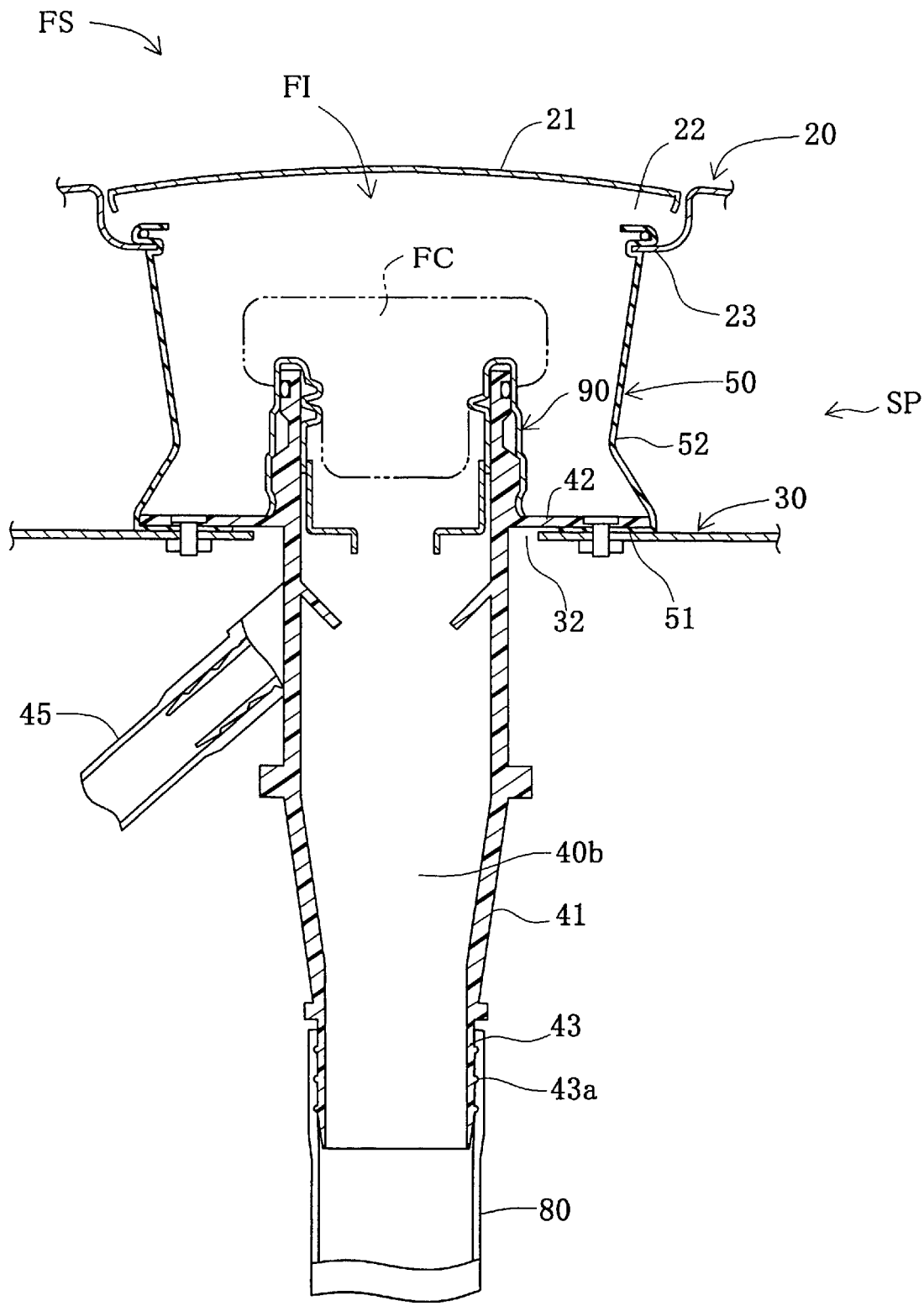
FIG. 3 is a sectional view illustrating a part in the vicinity of a fuel inlet unit of the automobile in the first embodiment.
Figure 4:
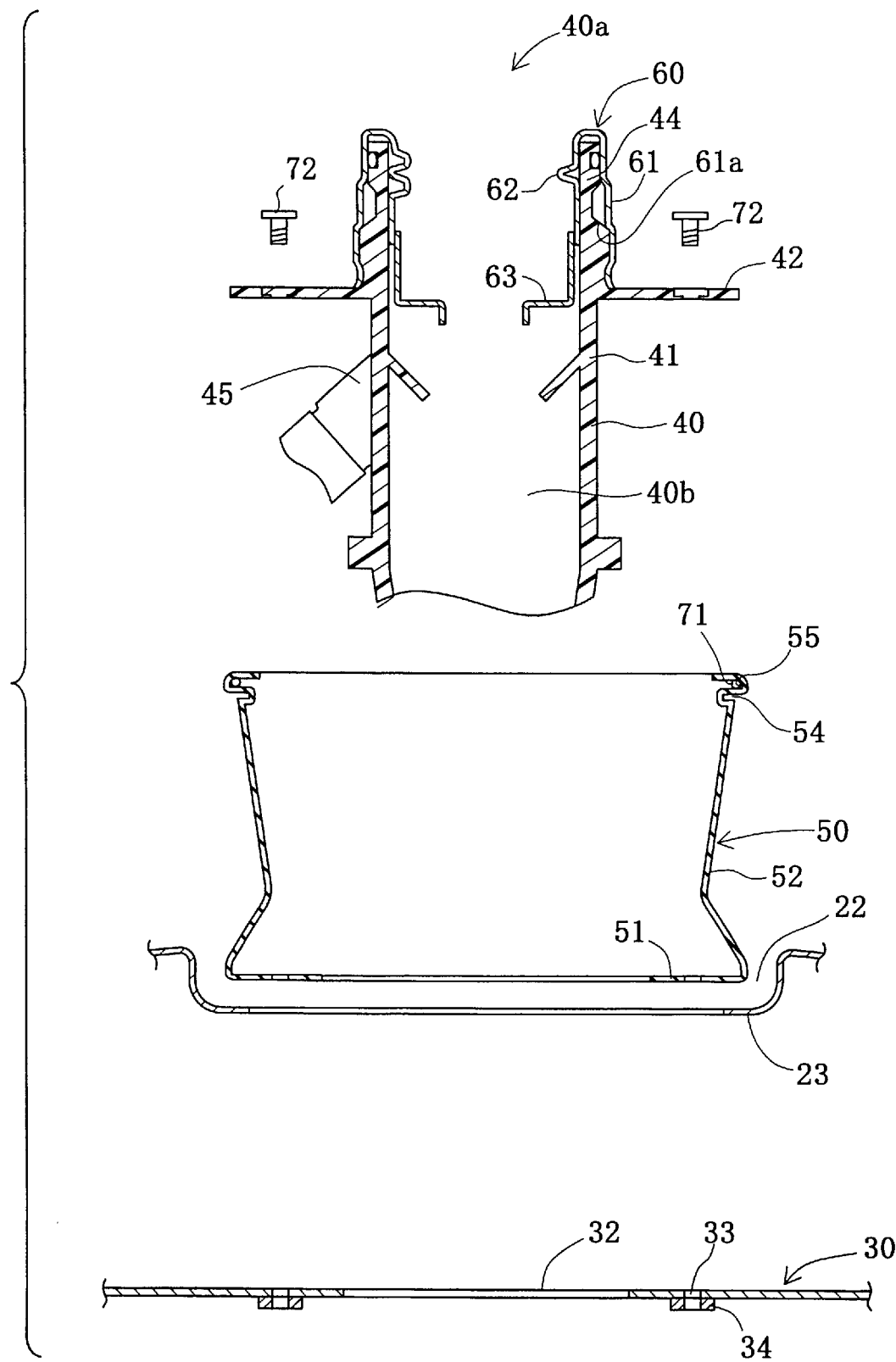
FIG. 4 is a sectional view illustrating the part of FIG. 3 in a disassembled state.

The respective constituents of the fuel feeding mechanism FS are described in detail. FIG. 3 is a sectional view illustrating a part in the vicinity of the fuel inlet unit FI of the automobile, and FIG. 4 is a sectional view illustrating the part of FIG. 3 in a disassembled state. A filler opening 22, which is opened and closed by a filler cover 21, is formed in the outer side member 20 of the automobile. A filler hole 40a of the inlet filler pipe 40 is disposed inside the filler opening 22. The inlet filler pipe 40 leads the supply of fuel to the tank main body TB via the connection pipe 80 (see FIG. 2). The inlet filler pipe 40 includes a pipe main body 41 having a passage 40b formed therein, a flange 42 located a little below the filler hole 40a of the pipe main body 41, a joint 43 formed on a lower end of the pipe main body 41, and a breather pipe 45 branching off a side wall of the pipe main body 41, which are integrally made of a fuel-resistant resin. The joint 43 is press fit into one end of the connection pipe 80, so that the inlet filler pipe 40 is connected with the connection pipe 80. A seal projection 43a is formed around the joint 43 in order to enhance the seal against the connection pipe 80.

Figure 5:
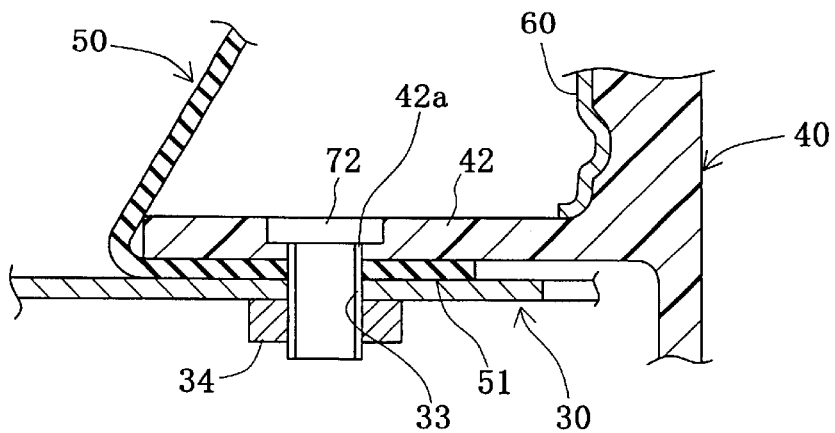
FIG. 5 is a sectional view illustrating a part in the vicinity of a flange of an inlet filler pipe in the first embodiment.
Figure 6A:
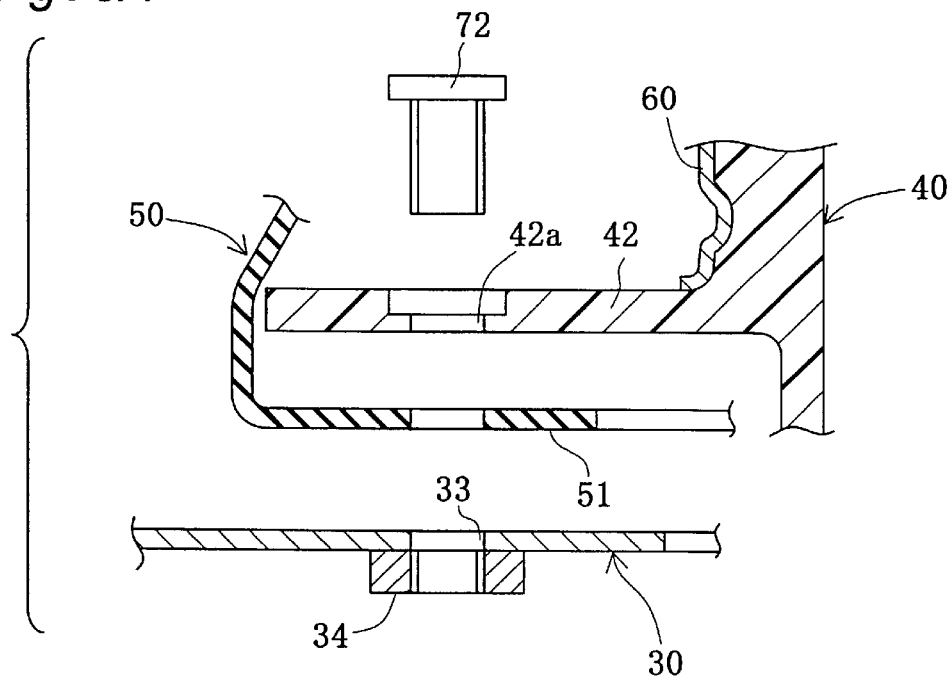
FIG. 6A is a sectional view illustrating the part of FIG. 5 in a disassembled state.

The flange 42 extends from the side wall of the pipe main body 41 to a disk shape. The flange 42 is attached to an opening 32 of the outer wheel house 30 to hold one end of the seal cup 50. FIG. 5 is a sectional view illustrating a part in the vicinity of the flange 42, and FIG. 6A is a sectional view illustrating the part of FIG. 5 in a disassembled state. The flange 42 has bolt holes 42a. Bolts 72 fit in the respective bolt holes 42a and a bolt holes 33 of the outer wheel house 30 and are fastened with nuts 34 so that the flange 42 of the inlet filler pipe 40 is attached to the outer wheel house 30 and holds a cup bottom 51 of the seal cup 50. The nuts 34 are welded to the lower face of the outer wheel house 30.

Figure 7:
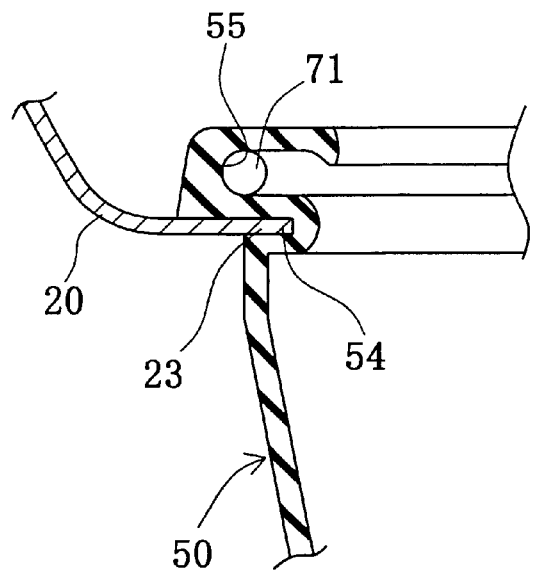
FIG. 7 is a sectional view illustrating a part in the vicinity of the cup opening of a seal cup in the first embodiment.
Figure 8:
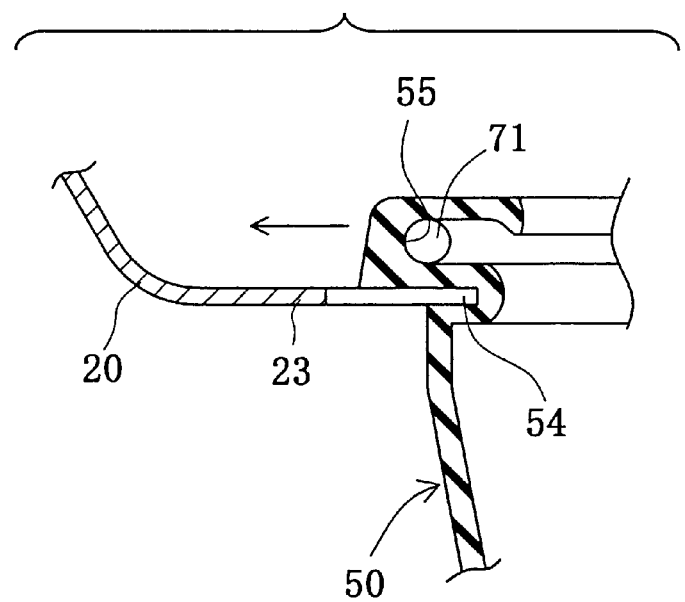
FIG. 8 is a sectional view illustrating the part of FIG. 7 in a disassembled state.

Referring back to FIG. 4, the seal cup 50 is made of a rubber material and is formed in a cup shape defined by a side wall 52 and a cup bottom 51. The cup bottom 51 of the seal cup 50 is held between the flange 42 and the opening 32 of the outer wheel house 30, whereas a cup opening of the seal cup 50 is attached to the outer side member 20. FIG. 7 is a sectional view illustrating a part in the vicinity of the cup opening of the seal cup 50, and FIG. 8 is a sectional view illustrating the part of FIG. 7 in a disassembled state. A fixation recess 54 is formed at the opening of the seal cup 50. An opening peripheral part 23 of the outer side member 20 is press fit into the fixation recess 54 so that the seal cup 50 is attached to the outer side member 20. A ring recess 55 is also formed at the opening of the seal cup 50. A fixation ring 71 is press fit into the ring recess 55 in order to keep the opening of the seal cup 50 in a circular shape and enhance the adhesive strength to the outer side member 20. The seal cup 50 is attached to the outer side member 20 at its opening and to the outer wheel house 30 at the cup bottom 51. The seal cup 50 of this configuration seals the vicinity of the filler cap FC from the space SP between the outer side member 20 and the wheel house outer 30 to protect an electric system wired in the space SP from invasion of water and to prevent water from entering a lower closed space defined by the outer side member 20 and the outer wheel house 30.

Referring back again to FIG. 4, the connector 60 is attached to the end of the inlet filler pipe 40. The connector 60 is a metal member to which the filler cap FC is detachably attached, and includes a connector main body 61 having an attachment space 61a formed therein. A cap support 44 of the inlet filler pipe 40 is inserted into the attachment space 61a so that the connector 60 is attached to the end of the inlet filler pipe 40. The connector main body 61 also has an inner thread 62 to stop the filler cap FC and a positioning element 63 to position the filler gun inserted for the fuel supply.

Figure 9:
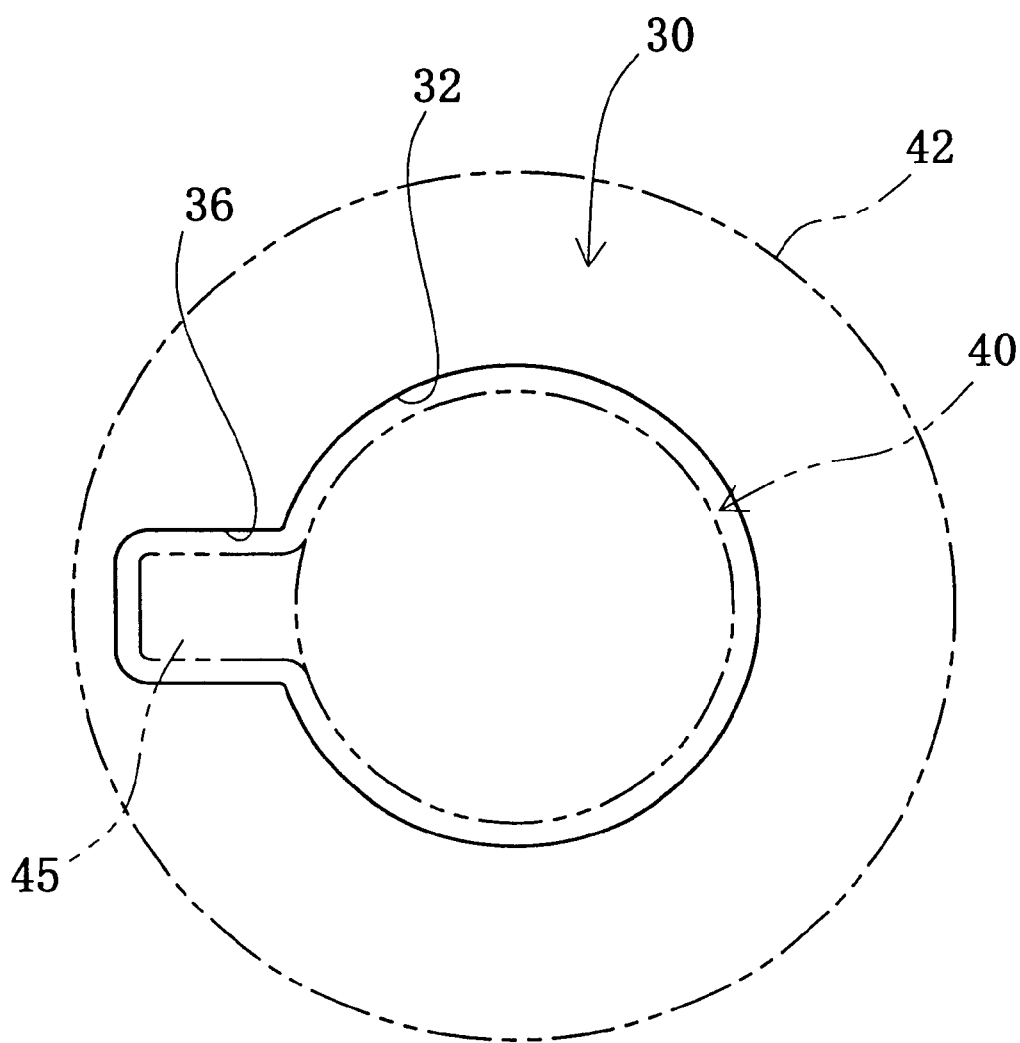
FIG. 9 shows the positional relationship between the opening of an outer wheel house and the inlet filler pipe.

FIG. 9 shows the positional relationship between the opening 32 of the outer wheel house 30 and the inlet filler pipe 40. An insertion notch 36 is formed at the opening 32 of the outer wheel house 30. The breather pipe 45 protrudes from the side wall of the inlet filler pipe 40 as mentioned above. The insertion notch 36 prevents the breather pipe 45 from interfering with insertion of the inlet filler pipe 40 into the outer wheel house 30.

Referring back to FIG. 2, the connection pipe 80 connecting with the lower end of the inlet filler pipe 40 is made of a rubber material or a resin material and has a bellows 81 to enhance the bendability. The check valve 90 is attached to the lower end of the connection pipe 80.

Figure 10:
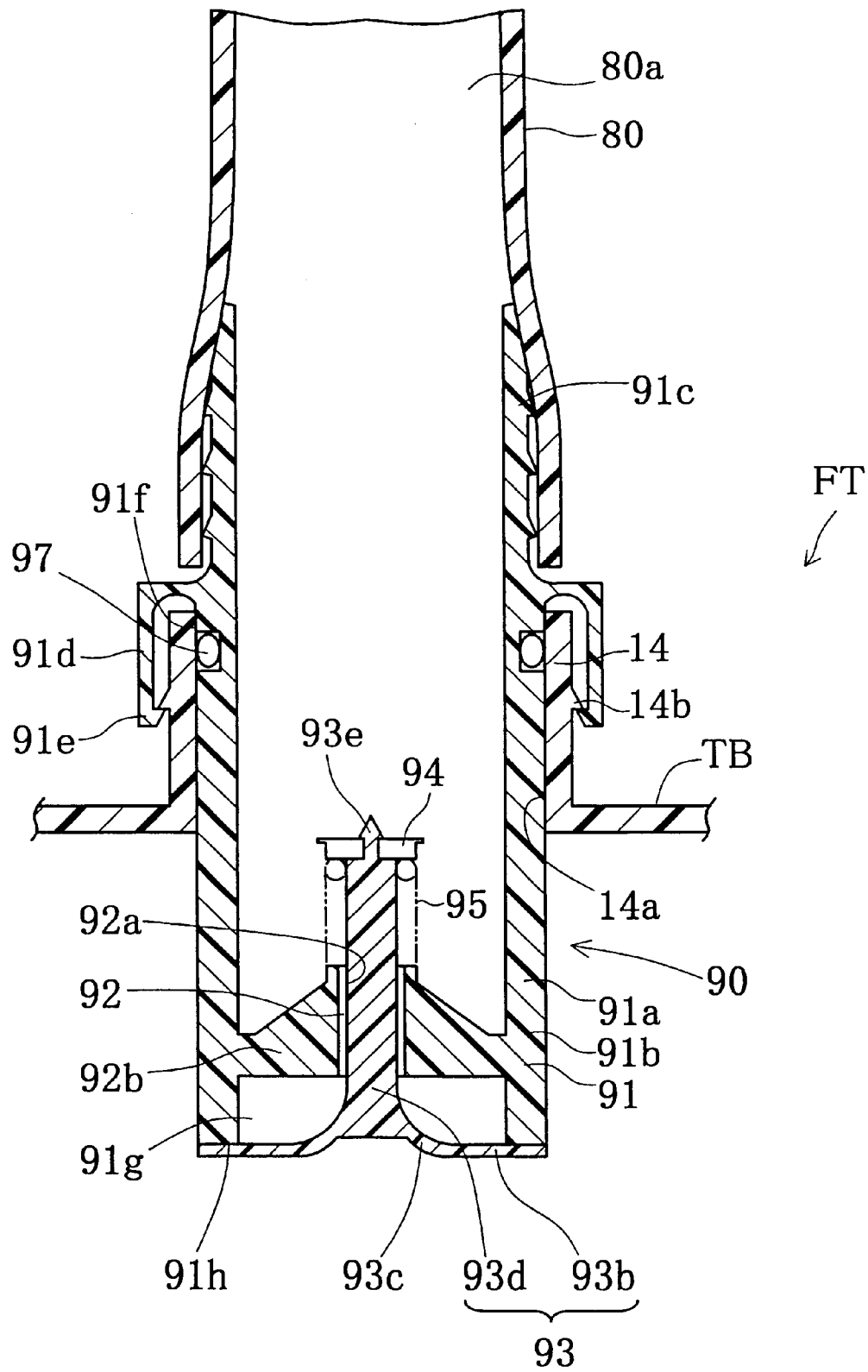
FIG. 10 is a sectional view illustrating a part in the vicinity of the tank main body of the fuel tank with a check valve attached thereto.
Figure 11:
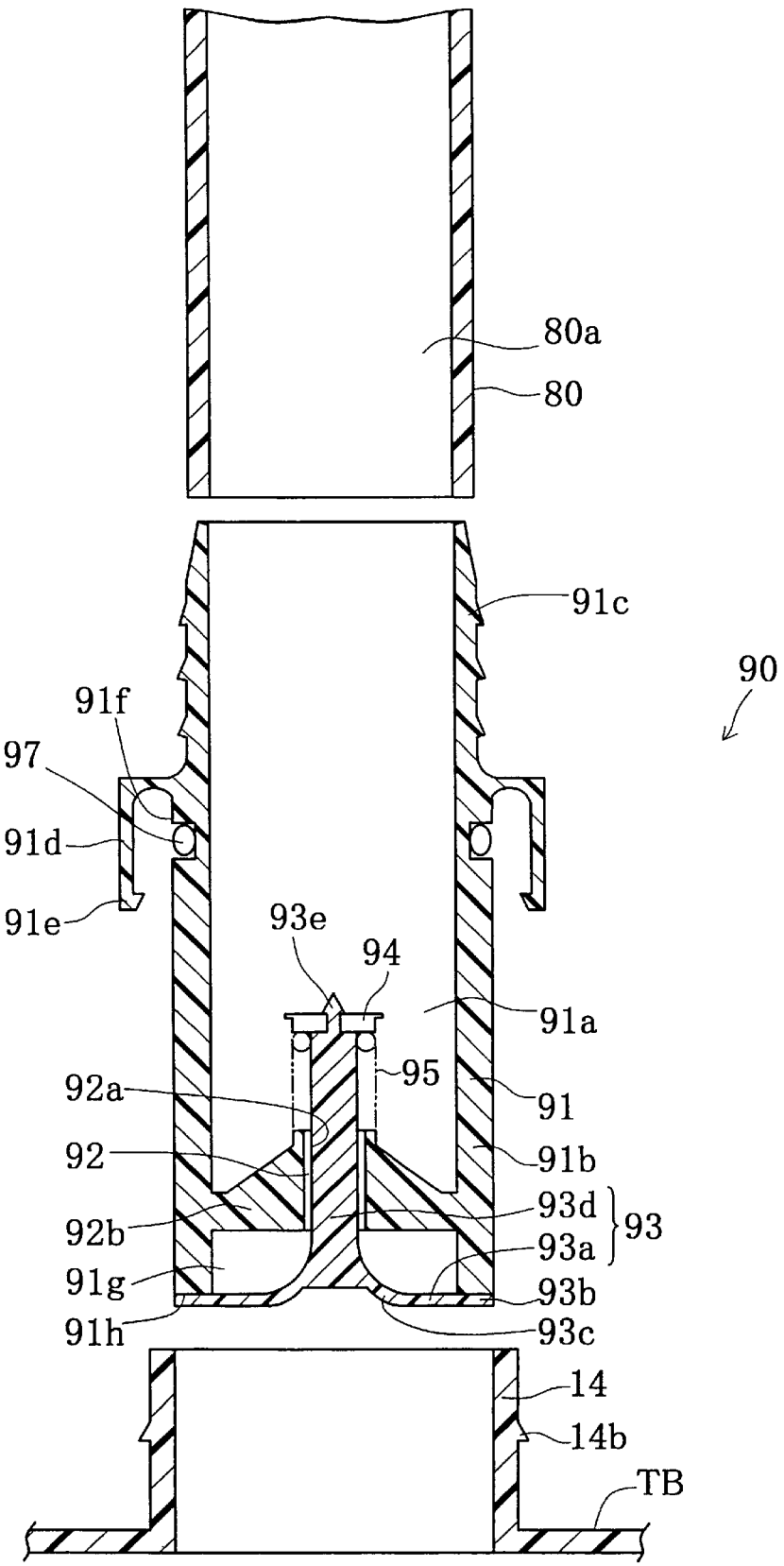
FIG. 11 is a sectional view illustrating the check valve before being attached to the tank main body.

FIG. 10 is a sectional view illustrating a part in the vicinity of the tank main body TB with the check valve 90 attached thereto, and FIG. 11 is a sectional view illustrating the check valve 90 before being attached to the tank main body TB. A valve attachment 14 having a pipe form protrudes from the tank main body TB and has a passage 14a formed therein to make the tank main body TB communicate with the outside. A pair of engagement projections 14b, 14b (the tank engagement elements) are formed on the side wall of the valve attachment 14 and arranged at an interval of 180 degrees to hold the check valve 90.

Figure 12:
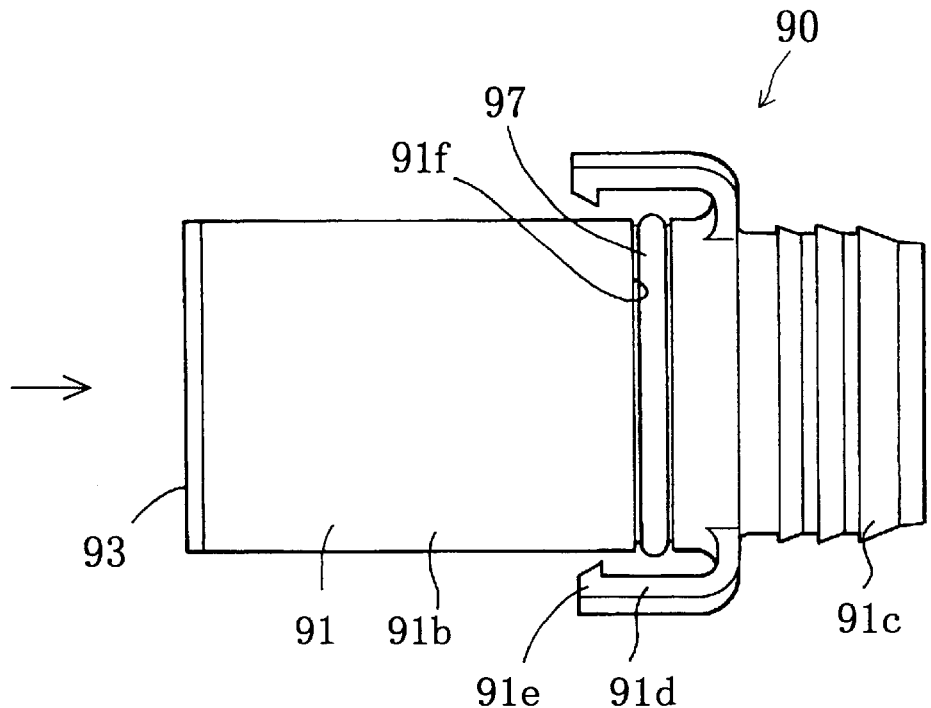
FIG. 12 is a side view illustrating the check valve.
Figure 13:
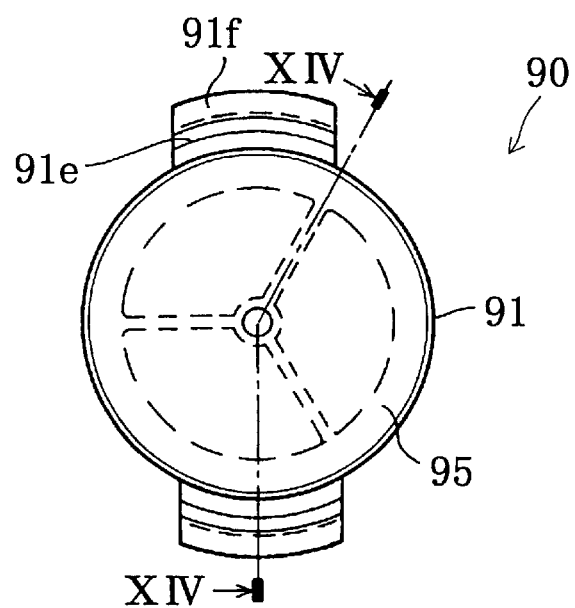
FIG. 13 is a view seen from the direction of the arrow in FIG. 12.
Figure 14:
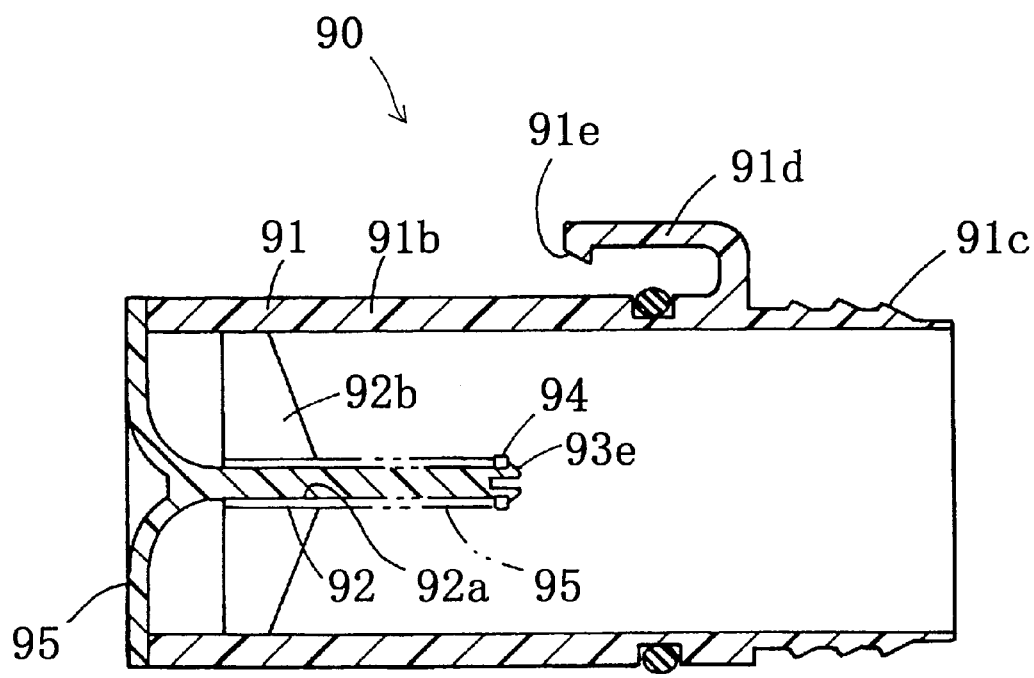
FIG. 14 is a sectional view of the check valve, taken on the line XIV—XIV in FIG. 13.

FIG. 12 is a side view illustrating the check valve 90, FIG. 13 is a view from the direction of the arrow in FIG. 12, and FIG. 14 is a sectional view of the check valve 90, taken on the line XIV—XIV in FIG. 13. The check valve 90 has a housing 91 that defines a valve chest 91a communicating with a fuel passage 80a of the connection pipe 80, a valve disc 93, and a spring 95 as main constituents.

The housing 91 has a cylindrical shape and includes a side wall 91b and a hose connection end 91c extending from the side wall 91b, which are formed integrally. The valve chest 91a is formed inside the housing 91. The hose connection end 91c is connected to the end of the connection pipe 80 so that the fuel passage 80a of the connection pipe 80 communicates with the valve chest 91a. An engagement piece 91d (the valve engagement element) is formed around the circumference of the housing 91. The engagement piece 91d is a resilient overhang member having a claw 91e on a free end thereof. The claw 91e engages with the engagement projections 14b when the housing 91 of the check valve 90 is inserted into the valve attachment 14. This arrangement effectively prevents the check valve 90 from slipping off the valve attachment 14. A circular groove 91f is also formed around the circumference of the housing 91. An O ring 97 is set in the circular groove 91f in order to seal the housing 91 against the valve attachment 14.

The other end of the housing 91 forms a discharge outlet 91g, which is opened and closed by the valve disc 93. The valve disc 93 has a valve element 93a and a shaft 93d formed integrally with the valve element 93a. The valve element 93a has a seating portion 93b, which is seated on and separated from a mating seat 91h of the discharge outlet 91g to close and open the discharge outlet 91g. A flare portion 93c is formed integrally with the seating portion 93b. The flare portion 93c spreads out in order to cause the supply of fuel flowing through the valve chest 91a to be ejected from the discharge outlet 91g to a wider area.

The valve disc 93 is supported by a valve support 92 and three linkage elements 92b of the housing 91 via the shaft 93d thereof to be movable between the open position and the closed position. The three linkage elements 92b and the valve support 92 are disposed in he valve chest 91a of the housing 91 to support the valve disc 93. The three linkage elements 92b are arranged radially at the intervals of 120 degrees, and the flow of fuel passes through the spaces between the adjoining linkage elements 92b. The valve support 92 is integrated with a central joint of the three linkage elements 92b and has a valve support aperture 92a. The shaft 93d of the valve disc 93 passes through the valve support aperture 92a of the valve support 92 so that the valve disc 93 is supported in a movable manner by the housing 91. A free end of the shaft 93d forms a snap fit 93e, which engages with a spring catch 94 in an elastic manner.

The spring 95, which presses the valve disc 93, is set on the shaft 93d and spans between the valve support 92 and the spring catch 94 through the engagement of the snap fit 93e of the shaft 93d with the spring catch 94. The assembly of the check valve 90 inserts the shaft 93d of the valve disc 93 into the valve support aperture 92a of the valve support 92, sets the spring 95 on the shaft 93d of the valve disc 93, and causes the snap fit 93e of the shaft 93d to engage with the spring catch 94.

In the closed position, the check valve 90 of the above structure effectively prevents the liquid fuel and fuel vapors in the tank main body TB from flowing back through the connection pipe 80 and being released to the outside. During fueling, the supply of fuel, which is fed through the inlet filler pipe 40 and the connection pipe 80, flows through the fuel passage 80a into the valve chest 91a of the check valve 90 to reach the valve disc 93. When the pressure of flow of fuel applied to the valve disc 93 exceeds the pressing force of the spring 95, the valve disc 93 moves to its open position to enable the flow of fuel to enter the tank main body TB. The flare portion 93c in the valve element 93a of the valve disc 93 spreads out the flow of fuel, which is accordingly sprayed over a wide space in the tank main body TB. The flow of cold fuel lowers the saturated vapor pressure in the tank main body TB and prevents the fuel vapor from being released to the outside during fueling.

The following describes a process of attaching the fuel feeding mechanism FS to the vehicle body in the assembly line of the automobile. There is some work required in advance as the preparations for the attachment of the fuel feeding mechanism FS. The procedure of the work attaches the tank main body TB to the vehicle body and welds the nuts 34 to the outer wheel house 30. The connector 60 is attached to the cap support 44 of the inlet filler pipe 40. The connection pipe 80 is connected to the joint 43. The check valve 90 is attached to the end of the connection pipe 80. The procedure also fits the fixation ring 71 in the ring recess 55 of the seal cup 50, as shown in FIGS. 7 and 8.

The procedure then inserts the seal cup 50 and the assembled inlet filler pipe 40 from the outside of the vehicle body via the filler opening 22 of the outer side member 20. In this state, the breather pipe 45, which projects from the side wall of the inlet filler pipe 40, is positioned in the insertion notch 36 formed at the opening 32 of the outer wheel house 30, as shown in FIG. 9. The opening peripheral portion of the cup bottom 51 of the seal cup 50 is then clamped between the flange 42 of the inlet filler pipe 40 and the outer wheel house 30, as shown in FIGS. 5 and 6A. By the work through the filler opening 22 of the outer side member 20, the bolts 72 are fastened with the nuts 34, so that the seal cup 50 is attached between the flange 42 and the outer wheel house 30. As shown in FIGS. 10 and 11, the procedure causes the engagement piece 91d of the check valve 90 to engage with the valve attachment 14 and thereby be attached to the tank main body TB. This process attaches the fuel feeding mechanism FS to the outer side member 20 and the outer wheel house 30.

Figure 6B:
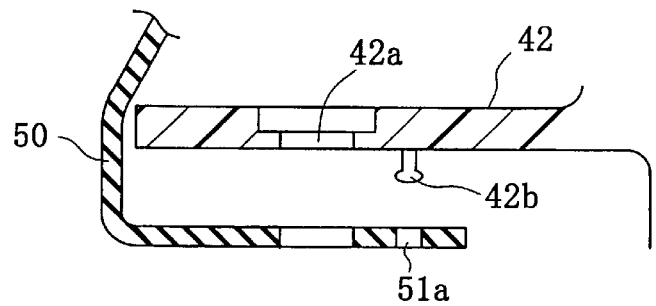
FIG. 6B is a sectional view illustrating a modified structure of the part shown in FIG. 5.

FIG. 6B shows a modified structure for attaching the inlet filler pipe 40 to the outer wheel house 30. In this modified structure, the flange 42 of the inlet filler pipe 40 has an engagement projection 42b for a temporary catch that fits in an engagement aperture 51a formed in the seal cup 50. In preparation for attachment of the fuel feeding mechanism FS, the procedure causes the engagement projection 42b to fit in the engagement aperture 51a in order to integrate the seal cup 50 with the inlet filler pipe 40. The assembled inlet filler pipe 40 is then inserted from the outside of the vehicle body via the filler opening 22 of the outer side member 20 for attachment.

The check valve 90 shown in the state of FIG. 11 is then attached to the tank main body TB. The procedure inserts the check valve 90 into the valve attachment 14 from the outside of the tank main body TB, and makes the claw 91e of the engagement piece 91d of the check valve 90 engage with the engagement projections 14b of the valve attachment 14. This configuration effectively prevents the check valve 90 from coming off the tank main body TB. In this state, the valve attachment 14 is sealed against the housing 91 of the check valve 90 with the O ring 97. The insertion of the check valve 90 into the passage 14a of the valve attachment 14 from the outside of the tank main body TB enables the quick attachment of the check valve 90 to the tank main body TB and ensures the high sealing properties.

In the attachment work of the fuel feeding mechanism FS, as the assembled inlet filler pipe 40 is inserted from the outside of the automobile via the filler opening 22 of the outer side member 20 for attachment, this arrangement does not require the attachment work at the bottom of the vehicle body, thus attaining the excellent workability.

In the process of attaching the inlet filler pipe 40 to the outer wheel house 30, as the cup bottom 51 of the seal cup 50 is held between the flange 42 of the inlet filler pipe 40 and the outer wheel house 30, this configuration enables the peripheral part of the filler cap FC to be sealed from the space SP between the outer side member 20 and the outer wheel house 30, simultaneously with the attachment work of the seal cup 50. Since the cup bottom 51 of the seal cup 50 also functions as the sealing member to seal the flange 42 of the inlet filler pipe 40 against the outer wheel house 30, this arrangement does not require any separate sealing member for this purpose and thus simplifies the structure of the fuel feeding mechanism FS.

Since the structure of the embodiment enables the check valve 90 to be attached to the tank main body TB from the outside thereof, the structure is accordingly applicable to both splittable and non-splittable fuel tanks, for example, metal fuel tanks as well as blowmolded resin fuel tanks.

Since the structure of the embodiment also enables the attachment work of the check valve 90 to be carried out after the coating and welding of the tank main body TB from the outside thereof, it is thus not required to apply the heat resistant material for the check valve 90. This desirably extends the possible range of selection of the material and thereby reduces the manufacturing cost.

Figure 15:
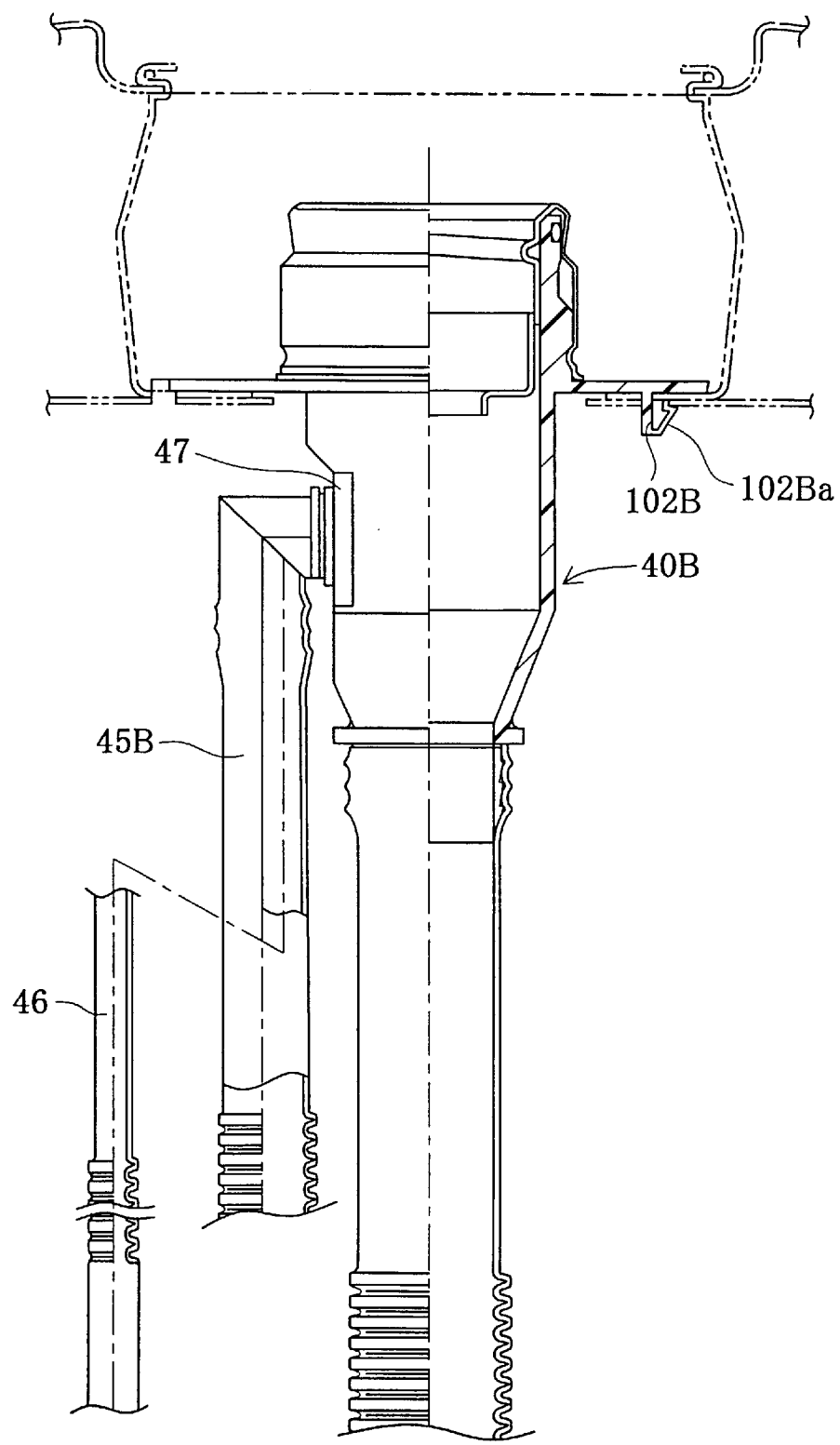
FIG. 15 is a semi-sectional view illustrating a fuel feeding mechanism in a second embodiment according to the present invention.
Figure 16:
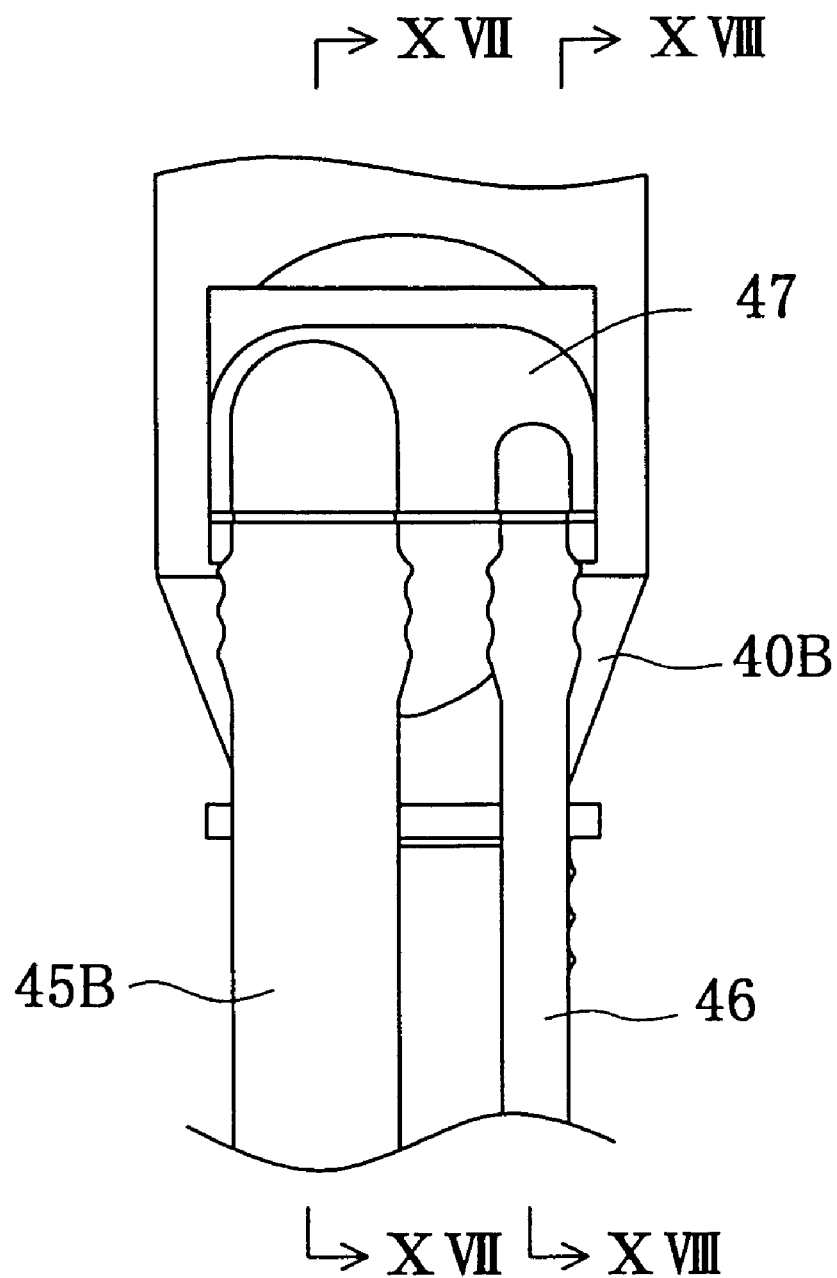
FIG. 16 is a side view illustrating a main part of the fuel feeding mechanism of FIG. 15.
Figure 17:
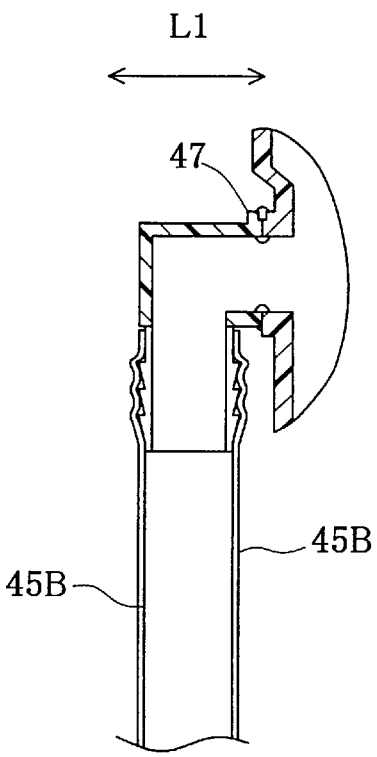
FIG. 17 is a sectional view taken on the line XVII—XVII of FIG. 16.
Figure 18:
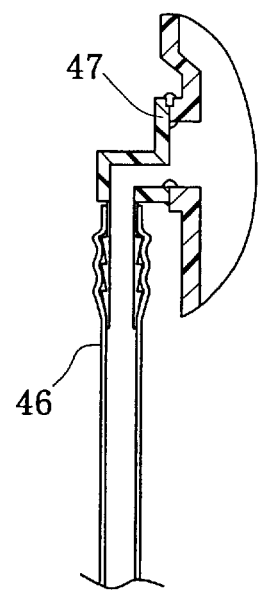
FIG. 18 is a sectional view taken on the line XVIII—XVIII of FIG. 16.

FIG. 15 is a semi-sectional view illustrating a fuel feeding mechanism of a second embodiment according to the present invention. FIG. 16 is a side view illustrating a main part of the fuel feeding mechanism of FIG. 15. FIG. 17 is a sectional view taken on the line XVII—XVII of FIG. 16, and FIG. 18 is a sectional view taken on the line XVIII—XVIII of FIG. 16. The second embodiment is characterized by the structure that an inlet filler pipe 40B is separate from a breather pipe 45B and a signal pipe 46 for keeping the pressure in the fuel tank at a fixed level. A flange 47 is formed at the joint ends of the breather pipe 45B and the signal pipe 46, and the breather pipe 45B and the signal pipe 46 are thermally welded to the inlet filer pipe 40B via the flange 47. The breather pipe 45 and the signal pipe 46 are bent at substantially right angles to be arranged in parallel with the inlet filler pipe 40B.

Since the breather pipe 45B and the signal pipe 46 are bent at substantially right angles relative to the inlet filler pipe 40B to shorten a distance L1 from the inlet filler pipe 40B, the structure of the second embodiment enables the assembled inlet filler pipe 40B to be attached to the outer wheel house 30 of the vehicle body without forming the insertion notch 36 at the opening 32 of the outer wheel house 30, as shown in FIG. 9. Since the breather pipe 45B is separate from the inlet filler pipe 40B in the structure of the second embodiment, this simplifies the parting process in injection molding and enables the use of common parts.

Figure 19:
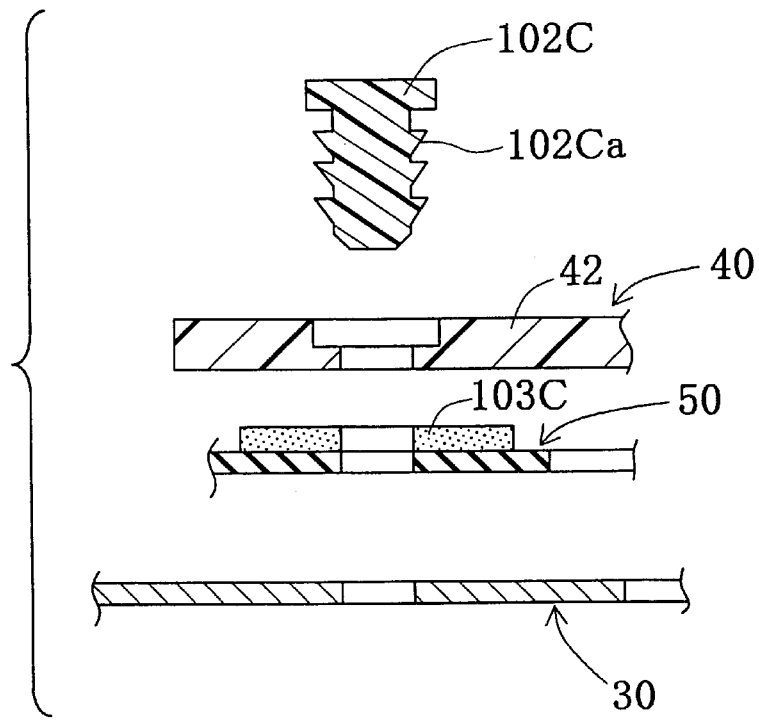
FIG. 19 is a sectional view showing a state prior to attachment of the inlet filler pipe to the outer wheel house with a clip in a variation.
Figure 20:
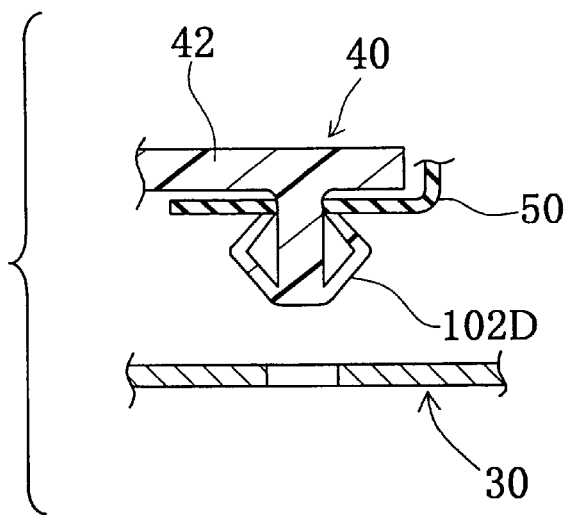
FIG. 20 is a sectional view showing a state prior to attachment of the inlet filler pipe to the outer wheel house with an engagement member in another variation.

A variety of methods, for example, bolts, screws, and clips, may be used to attach the inlet filler pipe 40 to the outer wheel house 30 (the member on the vehicle body) from the outside of the vehicle. Examples include a clip 102B shown in FIG. 15, a clip 102C shown in FIG. 19, and an engagement member 102D shown in FIG. 20. The clip 102B shown in FIG. 15 has an engagement element 102Ba on one end thereof. The clip 102C shown in FIG. 19 has a threaded-like engagement element 102Ca. The engagement member 102D shown in FIG. 20 is projected in a V shape from the lower face of the flange 42 of the inlet filler pipe 40. These engagement elements deform in an elastic manner to be fastened to the member on the vehicle body.

Since the elastic deformation of these clips 102B and 102C and the engagement member 102D functions as a catch to prevent slip-off without nuts this arrangement reduces the required number of parts and enables the quick attachment of the inlet filler pipe 40 to the outer wheel house 30, thereby enhancing workability. The use of any one of the clips 102B and 102C and the engagement member 102D enables the assembled inlet filler pipe 40 with the seal cup 50 attached thereto to be attached to the vehicle body, thereby further improving the workability. As shown in FIG. 19, a protecting plate 103C is made of spongy and is disposed between the flange 42 and the seal cup 50. Since the protection plate 103C has a soft cushion, the protecting plate 103C decreases a stress applied to the flange 42 when the flange 42 is attached to the wheel house outer 30. This enables to protect the flange 42 without damage of the surface of flange 42 and further improve the sealing properties. The protecting plate is applicable to another embodiment, for example, as shown in FIG. 1 and FIG. 20–30.

Other exemplary structural variations of attaching the inlet filler pipe 40 to the outer wheel house 30 (the member on the vehicle body) are shown in FIGS. 21 through 23, FIGS. 24 and 25, and FIGS. 27 through 30.

Figure 21:
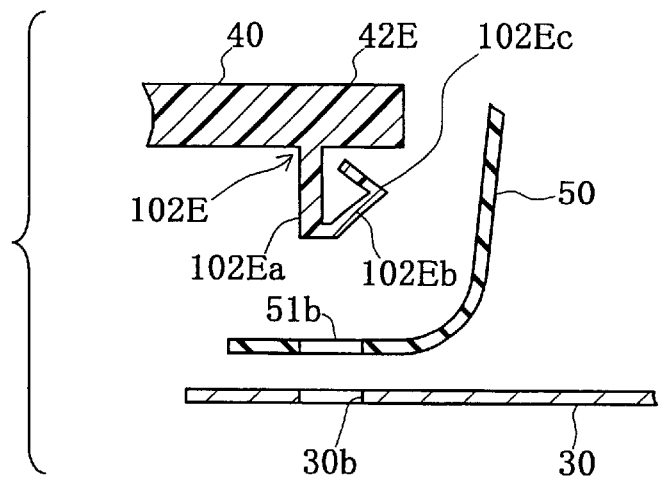
FIG. 21 is a sectional view illustrating a state prior to attachment of the inlet filler pipe to the outer wheel house with a clip in another variation.
Figure 22:
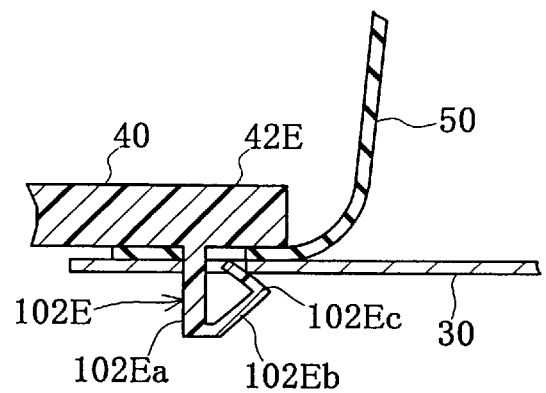
FIG. 22 is a sectional view illustrating a state of attachment of the inlet filler pipe to the outer wheel house with the clip in the variation of FIG. 21.
Figure 23:
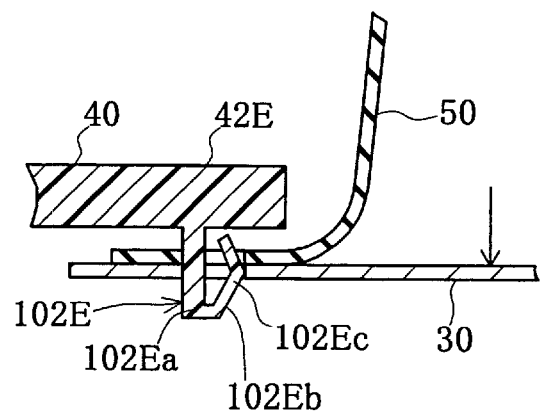
FIG. 23 is a sectional view illustrating a state of detaching the inlet filler pipe from the outer wheel house in the variation of FIG. 21.

Referring to FIGS. 21 through 23, a clip 102E, which projects from a flange 42E of the inlet filler pipe 40, detaches from the outer wheel house 30 when a load of at least a predetermined level is applied in a direction of separating the inlet filler pipe 40 from the outer wheel house 30. The clip 102E has a base 102Ea, a bent element 102Eb, and an engagement end 102Ec, which are constructed as an integral bent member. The clip 102E shown in FIG. 21 is inserted successively into a fixation aperture 51b of the seal cup 50 and a fixation aperture 30b of the outer wheel house 30, as shown in FIG. 22. The clip 102E is then elastically deformed, and the engagement end 102Ec thereof is pressed against the lower surface of the outer wheel house 30 to prevent detachment from of the inlet filler pipe 40.

In the case where the tank main body is moved, for example, by a vehicle collision and a load of at least the predetermined level is applied in the direction of separating the inlet filler pipe 40 from the outer wheel house 30, the portion between the base 102Ea and the engagement end 102Ec in the clip 102E is narrowed by elastic deformation and successively slips off the fixation apertures 30b and 51b, as shown in FIG. 23. This causes the inlet filler pipe 40 to detach from the outer wheel house 30 and protects the inlet filler pipe 40 from the large force.

Figure 24:
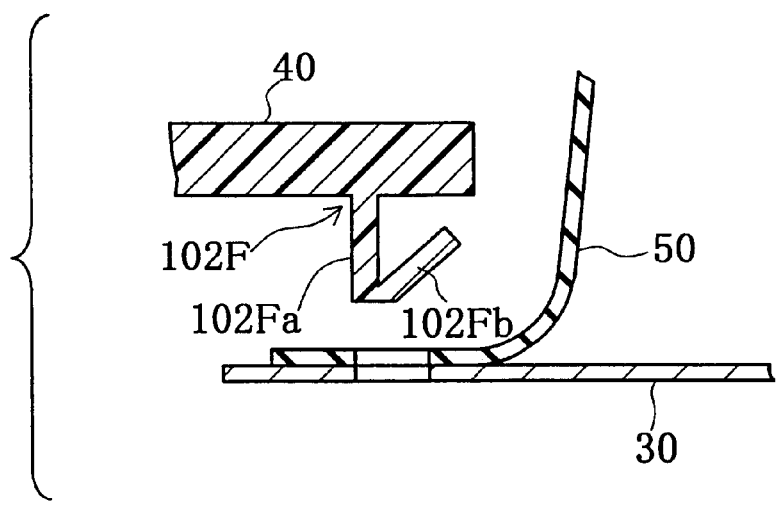
FIG. 24 is a sectional view illustrating a state prior to attachment of the inlet filler pipe to the outer wheel house with a clip in another variation.
Figure 25:
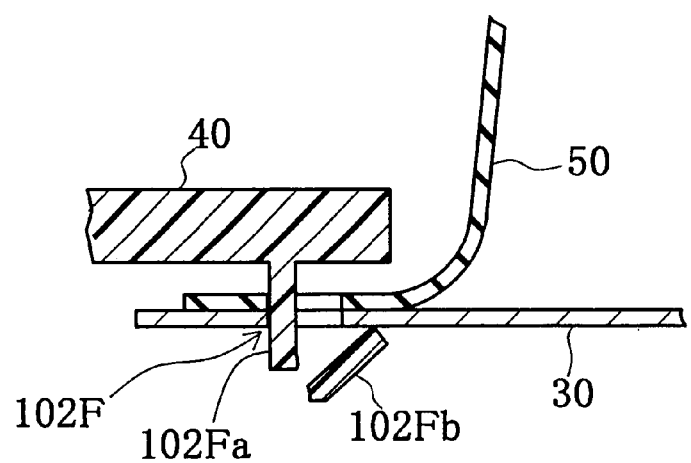
FIG. 25 is a sectional view illustrating a state of detaching the inlet filler pipe from the outer wheel house in the variation of FIG. 24.

Referring to FIGS. 24 and 25, a clip 102F is broken when a load of at least a predetermined level is applied in the direction of separating the inlet filler pipe 40 from the outer wheel house 30. The clip 102F includes a base 102Fa and an engagement end 102Fb, which projects at an acute angle from the base 102Fa. The base 102Fa and the engagement end 102Fb are constructed as an integral bent member. When a load of at least the predetermined level is applied between the inlet filler pipe 40 and the outer wheel house 30, the clip 102F is broken at the corner of acute angle between the base 102Fa and the engagement end 102Fb. This causes the inlet filler pipe 40 to detach from the outer wheel house 30 and prevents a large load from being applied to the inlet filler pipe 40.

Figure 26:
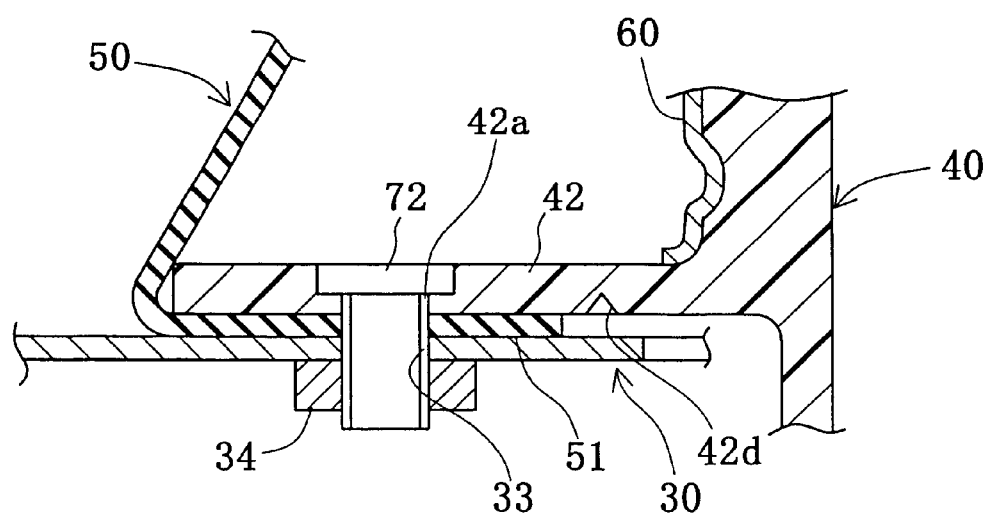
FIG. 26 is a sectional view illustrating another structure for detaching the inlet filler pipe from the outer wheel house.

As another way to detach the inlet filler pipe 40 from the outer wheel house 30 when a load of at least a predetermined level is applied, a circular groove 42d is formed on the lower surface of the flange 42 as shown in FIG. 26. Formation of the circular groove 42d at a specific place inward of the fastening means, that is, the bolts 72 and the nuts 34, in the flange 42 reduces the mechanical strength at that specific place. The flange 42 is broken at the circular groove 42d when a load of at least the predetermined level is applied, and thereby protects the outer wheel house 30. The circular groove 42d may be formed on both the upper surface and the lower surface of the flange 42. Formation of the circular groove 42d only on the lower surface of the flange 42, however, ensures the better design effects.

Figure 27:
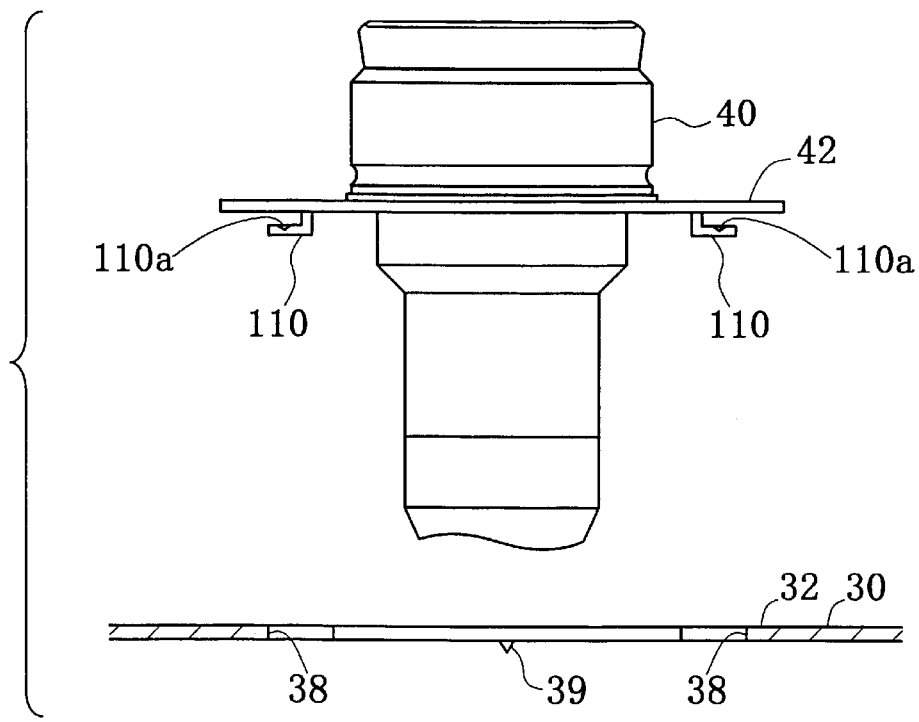
FIG. 27 shows a state prior to attachment of the inlet filler pipe to the outer wheel house in still another variation.
Figure 28:
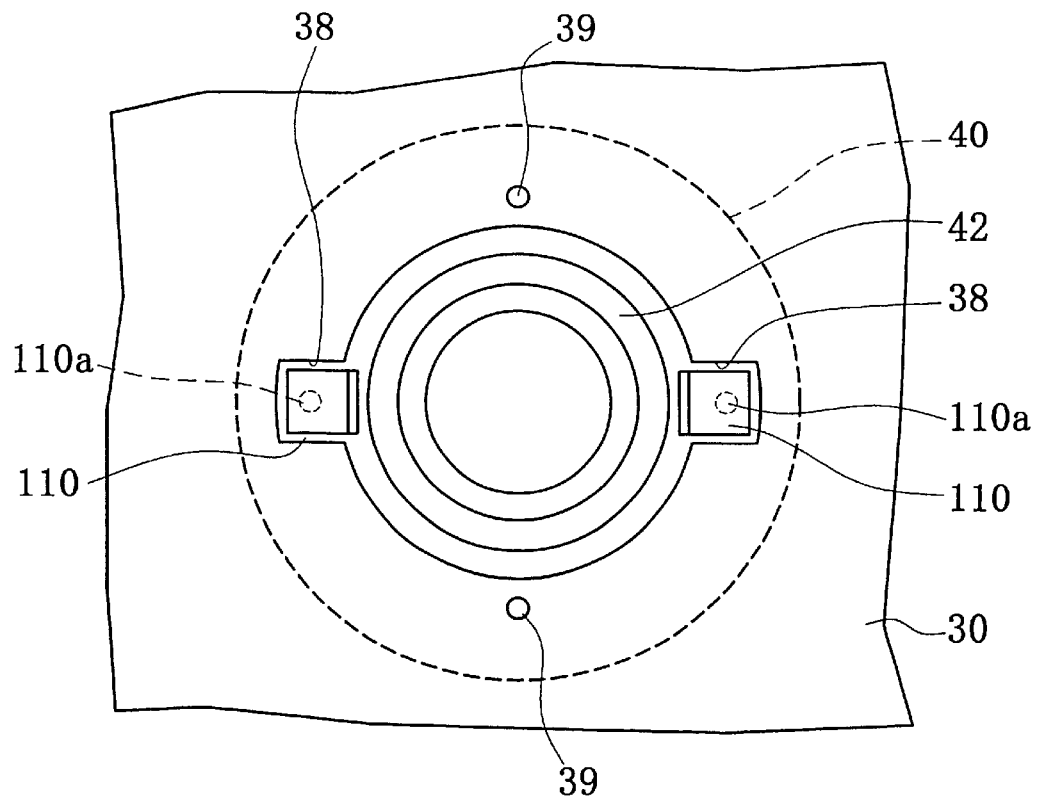
FIG. 28 is a bottom view illustrating the positional relationship between the inlet filler pipe and the outer wheel house, as seen from the bottom of FIG. 27.

Referring to FIGS. 27 through 30, the inlet filler pipe 40 may be attached to the outer wheel house 30 without using any bolts or clips. FIG. 27 shows a state prior to attachment of the inlet filler pipe 40 to the outer wheel house 30. FIG. 28 is a bottom view illustrating the positional relationship between the inlet filler pipe 40 and the outer wheel house 30 from the bottom of FIG. 27.

As shown in FIG. 27, a pair of L-shaped engagement pieces 110,110, respectively, having engagement recesses 110a, 110a project in an axially symmetrical manner from the lower surface of the flange 42 of the inlet filler pipe 40. Each of the engagement pieces 110 and the lower surface of the flange 42 defines a space in which the circumferential part of the opening 32 of the outer wheel house 30 fits. The opening 32 of the outer wheel house 30 has insertion notches 38, 38, to receive the engagement pieces 110, 110. The outer wheel house 30 also has engagement projections 39, 39, which are arranged perpendicular to the insertion notches 38, 38 and are fitted in the engagement recesses 110a, 110a.

Figure 29:
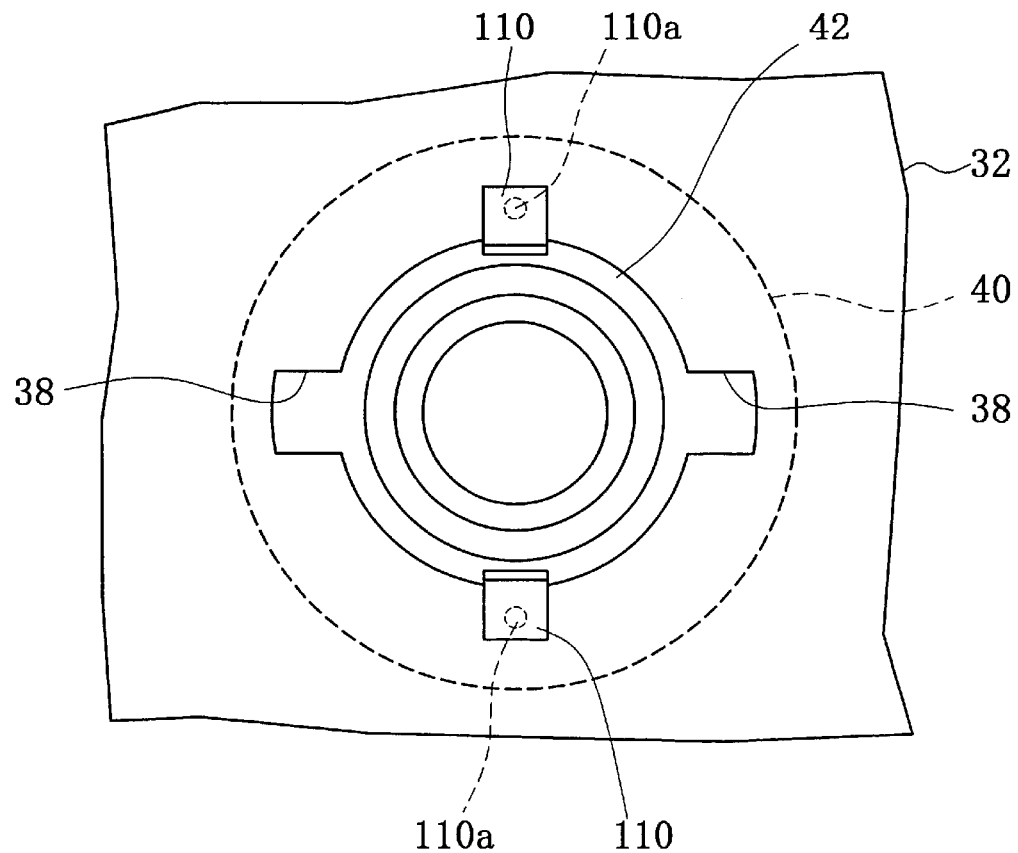
FIG. 29 is a bottom view showing the inlet filler pipe rotated by 90 degrees from the view in FIG. 28.
Figure 30:
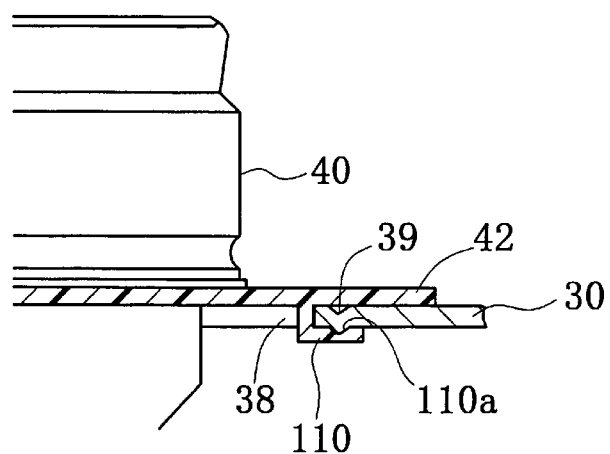
FIG. 30 shows a state of attachment of the inlet filler pipe to the outer wheel house with an engagement piece in the variation of FIG. 27.

The process of attaching the inlet filler pipe 40 to the outer wheel house 30 first positions the engagement pieces 110, 110 at the insertion notches 38, 38, as shown in FIG. 28, and then inserts the inlet filler pipe 40 from the outside of the vehicle. The process then rotates the inlet filler pipe 40 so that the circumferential part of the opening 32 of the outer wheel house 30 is held between the flange 42 and the engagement pieces 110, 110. When the inlet filler pipe 40 is rotated by approximately 90 degrees, the engagement projections 39, 39 contact the engagement recesses 110a, 110a, as shown in FIG. 29. Under application of a predetermined torque to the inlet filler pipe 40 causes the engagement projections 39, 39 to fit in the engagement recesses 110a, 110a. This positions the inlet filler pipe 40 relative to the outer wheel house 30.

Since no fastening means or fasteners, such as bolts, are used to attach the inlet filler pipe 40 to the outer wheel house 30, this structure does not require any tools for fastening and thereby has excellent workability. Since the predetermined torque is required to make the engagement projections 39, 39 fit in the engagement recesses 110a, 110a, this gives the user a certain feeling of attachment at the time of the engagement and enables the user to confirm the secure engagement.

The cup bottom 51 of the seal cup 50 is held as the sealing means or seal between the flange 42 of the inlet filler pipe 40 and the outer wheel house 30 in the above embodiments. Another sealing means or seal may, however, be used for the same purpose.

Since static electricity accumulates on the inner wall surface of the inlet filler pipe 40 during the flow of fuel during fueling, the inlet filler pipe 40 may be made of a conductive resin having electric conductivity and function as grounding.

The inlet filler pipe 40 made of the conductive resin may be obtained by mixing one or a plurality of conductive whiskers, conductive carbon, conductive graphite powder, surface active agent and ionic conduction polymer with a resin material and injection molding the resin mixture. It is preferable that the inlet filler pipe has a volume resistivity that enables conduction of static electricity, concretely a volume resistivity of not greater than $10^{11}$ $\Omega \cdot cm$, or more specifically range from not greater than $10^9$ $\Omega \cdot cm$ to $10^4$ $\Omega \cdot cm$.

In order to attain such a volume resistivity, for example, 5 parts by weight of conductive whiskers and 10 parts by weight of conductive carbon are mixed with 100 parts by weight of polyacetal or polyamide (PA). One example of the conductive whiskers has a trade name of Dentol manufactured by Otsuka Chemicals Co., Ltd., and one example of the conductive carbon has a trade name of Bulkan manufactured by Cabot Corp. The conductive fine material, such as conductive whiskers, conductive carbon, and conductive graphite, is mixed with the dielectric base resin material, such as polyacetal or polyamide, since the inlet filler pipe 40 that is made of only a conductive resin and fulfills the above condition of the volume resistivity undesirably has low mechanical strength and insufficient shock resistance.

Any resin having excellent fuel resistance and fuel impermeability other than polyacetal and polyamide may be used as the base resin material mixed with the conductive material. Fluororesin (ETFE) is another preferable example of such resin.

As part of the inlet filler pipe 40 is in contact with the wheel house outer 30, the inlet filler pipe 40 having the electric conductivity works as ground relative to the member on the vehicle body. This does not require troublesome grounding wiring on the inlet filler pipe 40, thus improving the workability and reducing the manufacturing cost.

A variety of techniques other than the technique of injection molding the conductive resin to the inlet filler pipe 40 may be applied to give the electric conductivity to the inlet filler pipe 40. One of such techniques applies the conductive material on the surface of the inlet filler pipe 40. Another technique makes the inlet filler pipe 40 have a two-layered structure (an inner layer and an outer layer) and applies the conductive resin at least to the inner layer that is in direct contact with the flow of fuel.

Figure 31:
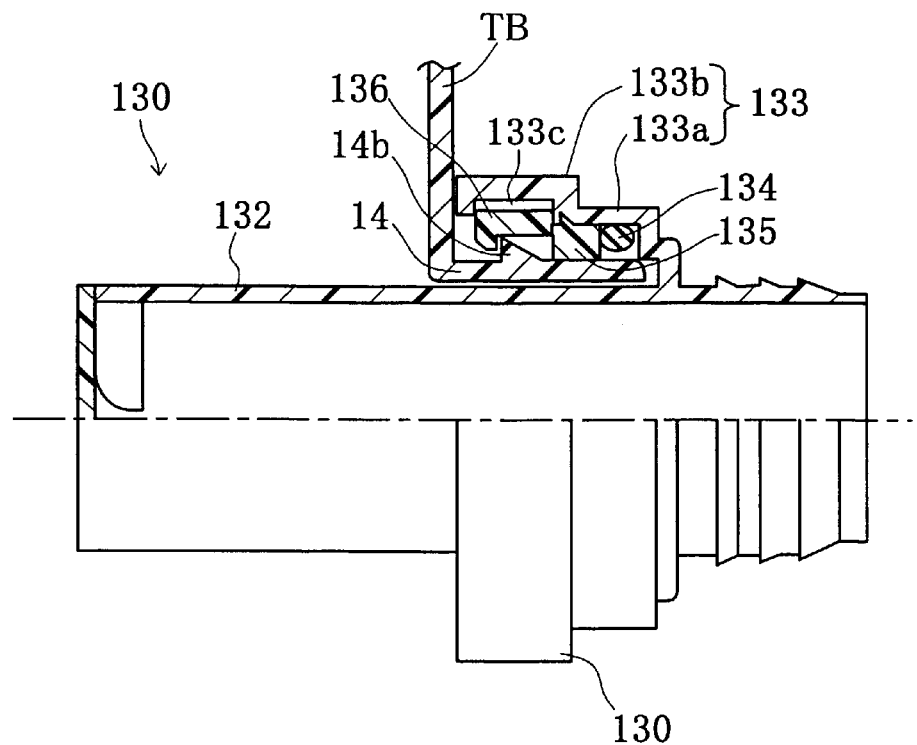
FIG. 31 is a semi-sectional view illustrating another check valve in a modification of the present invention.
Figure 32:
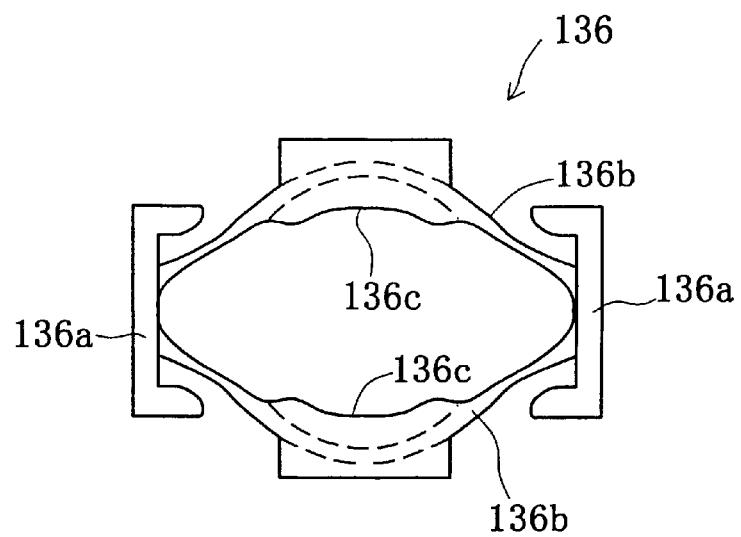
FIG. 32 is a plan view showing a retainer of the check valve shown in FIG. 31.

FIG. 31 is a semi-sectional view illustrating another check valve 130 as a modification of the present invention. The check valve 130 shown in FIG. 31 has a similar structure to that of the check valve 90 shown in FIG. 10, except the attachment structure to the valve attachment 14 of the tank main body TB. Referring to FIG. 31, in the check valve 130, a circular support member 133 is formed around the circumference of a housing 132. The circular support member 133 has a stop-like structure including a smaller-diametral element 133a extending from the outer circumference of the housing 132 and a larger-diametral element 133b further extending from the smaller-diametral element 133a. Inside of the step-like structure of the circular support member 133 defines an accommodation space 133c. The accommodation space 133c has an inner circumferential space to receive the valve attachment 14 of the tank main body TB and an outer circumferential space to receive an O ring 134 and a spacer 135. The O ring 134 is received at the deepest position in the accommodation space 133c to seal the housing 132 against the valve attachment 14. The spacer 135 comes into contact with the side face of the O ring 134 to prevent rattling of the O ring 134. A retainer 136 is kept in the accommodation space 133c that is defined by the larger-diametral element 133b. FIG. 32 is a plan view illustrating the retainer 136. The retainer 136 includes a pair of support elements 136a, 136a supported by the inner wall surface of the large-diametral element 133b, a pair of arch elements 136b, 136b spanned between the pair of support elements 136a, 136a, and a pair of clicks 136c, 136c (the valve engagement elements) respectively, attached to the arch elements 136b, 136b. The clicks 136c, 136c engage with the engagement projections 14b, 14b (the tank engagement elements) when the housing 132 of the check valve 130 is inserted into the valve attachment 14. This arrangement effectively prevents the check valve 130 from slipping off the valve attachment 14.

The process of attaching the check valve 130 to the tank main body TB first receives the O ring 134 in the accommodation space 133c of the circular support member 133, presses the O ring 134 with the spacer 135, and receives the retainer 136 in the accommodation space 133c. The process then inserts the check valve 130 into the valve attachment 14 from outside of the tank main body TB. The valve attachment 14 contacts the engagement projections 14b, 14b thereof with the clicks 136c, 136c of the retainer 136 to press open the arch elements 136b, 136b. While the engagement projections 14b, 14b ride over the clicks 136c, 136c, the valve attachment 14 is inserted into the inner circumferential space of the accommodation space 133c. This causes the engagement projections 14b, 14b to engage with the clicks 136c, 136c and prevents the check valve 130 from disengaging from the tank main body TB. In this state, the O ring 134 seals the housing 132 of the check valve 130 against the valve attachment 14. In this structure, the O ring 134 of the check valve 130 is positioned on the outer circumferential side of the valve attachment 14. The clicks 136c, 136c used for the engagement with the tank main body TB are constructed as separate elements from the housing 132. As discussed above, a variety of structures are applicable for sealing and attachment.

The present invention is not restricted to the above embodiments or their modifications, but there may be many other modifications, changes, and alterations without departing from the scope or spirit of the main characteristics of the present invention. Some examples of possible modification are given below.

(1) In the above embodiments, the housing 91 of the check valve 90 and the connection pipe 80 are formed as separate elements, which are capable of being joined with each other. The housing 91 of the check valve 90 and the connection pipe 80 may, however, be constructed as an integral element. This configuration desirably reduces the required number of parts. The resin pipe has a lower fuel or oil permeability than the rubber hose.

(2) In the above embodiments, only one sealing member, for example, the O ring, is used between the check valve 90 and the valve attachment 14. A plurality of sealing members of any suitable structure may be arranged in parallel according to the required specification of the sealing properties.

Figure 33:
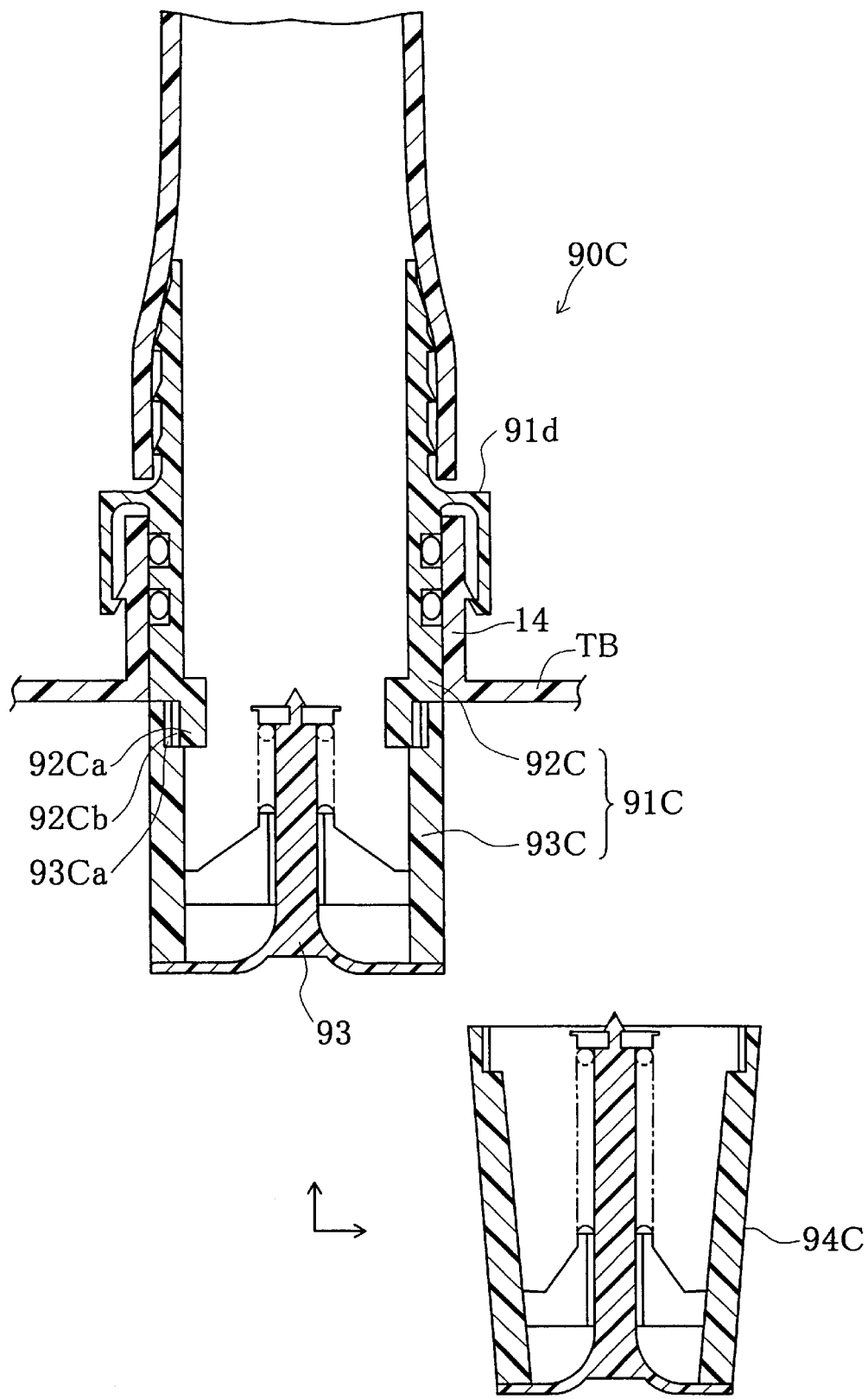
FIG. 33 is a sectional view illustrating another check valve in another modification of the present invention.

FIG. 33 is a sectional view illustrating another check valve 90C of another modification of the present invention. The check valve 90C is characterized by the splittable structure of a housing 91C and otherwise has a similar structure to that of the check valve 90 shown in FIG. 10. The housing 91C has a first housing section 92C with the engagement piece 91d used for the attachment to the tank main body TB and a second housing section 93C with the valve disc 93. The first housing section 92C has an inner circular element 92Ca on one end thereof. A male threaded portion 92Cb is formed around the outer circumference of the inner circular element 92Ca. The second housing section 93C has a female threaded portion 93Ca formed around the inner circumference on one end thereof. The female threaded portion 93Ca of the second housing section 93C is screwed to the male threaded portion 92Cb of the first housing section 92C. The engagement of the male threaded portion 92Cb with the female threaded portion 93Ca enables the first housing section 92Ca to be integrally joined with the second housing section 93C.

The process of attaching the check valve 90 to the tank main body TB first mounts the valve disc 93 and the other elements to the second housing section 93C, joins the second housing section 93C with the first housing section 92C, and makes the engagement piece 91d of the check valve 90 engage with the valve attachment 14 of the tank main body TB.

Even if the layout, the angle, or the length of the inlet filler pipe 40 varies according to the type of the vehicle and requires different configuration of the check valve, the splittable structure of the check valve 90C enables another second housing section 94C having a different structure from that of the second housing section 93C to be joined with the first housing section 92C and form another check valve of the different structure. This requires only a change of the second housing section 93C to 94C and does not require the change of the whole structure of the check valve. This arrangement does not require different molds of the check valve for different types of vehicles, thereby desirably reducing the manufacturing cost.

Figure 34:
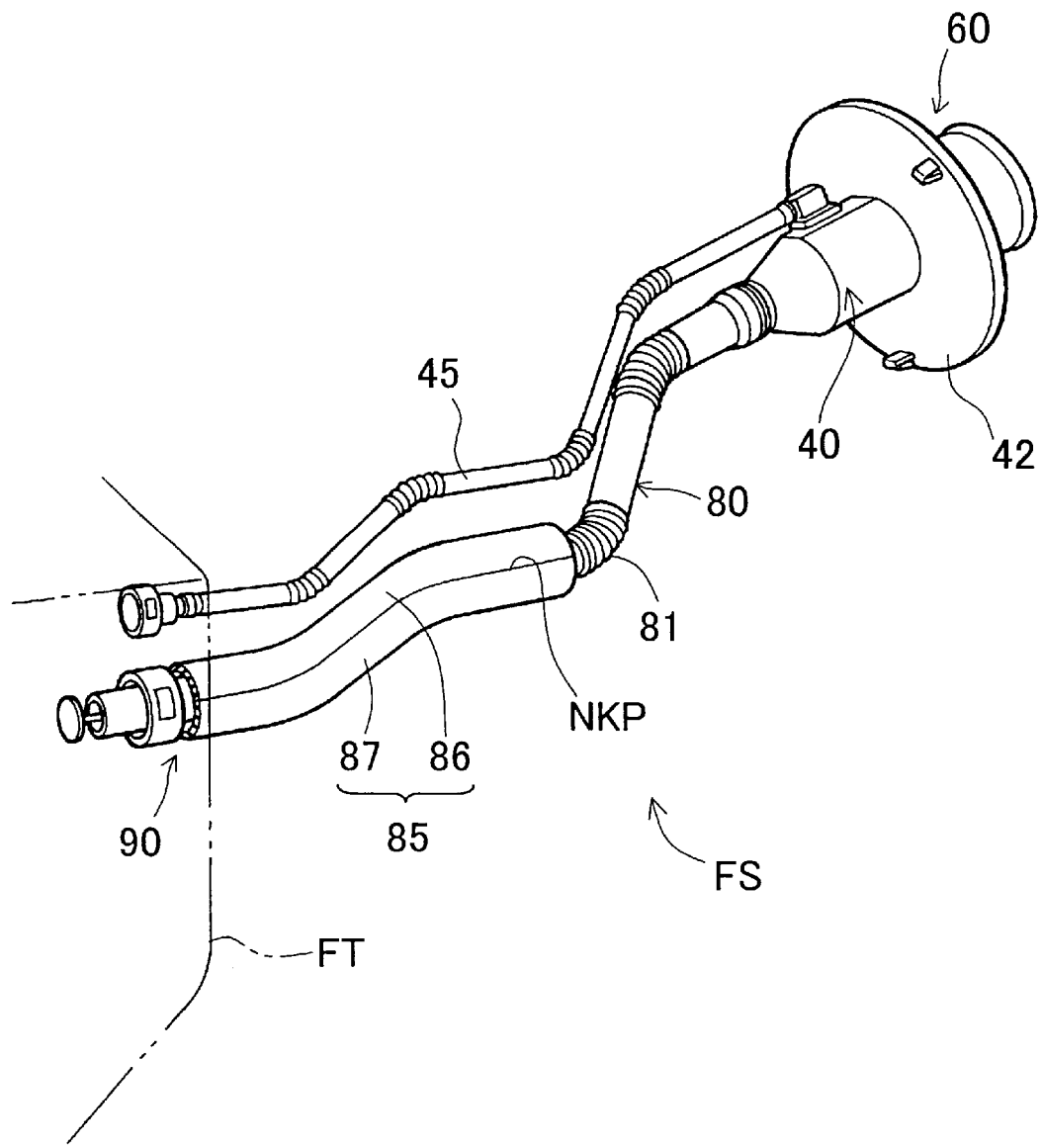
FIG. 34 is a perspective view schematically illustrating another fuel feeding mechanism for feeding a supply of fuel into the fuel tank of the automobile in a third embodiment according to the present invention.

FIG. 34 is a perspective view schematically illustrating another fuel feeding mechanism for feeding a supply of fuel into the fuel tank of the automobile of a third embodiment according to the present invention. The fuel feeding mechanism of the third embodiment has the connection pipe 80 with a protector 85. In the structure of the third embodiment, the connection pipe 80 connecting with the lower stream side of the inlet filler pipe 40 is made of either a rubber or a resin, and has a bellows 81 to enhance the bending property at an adequate portion thereof. The connection pipe 80 is thus readily bent at the portion of the bellows 81 and is bendable to some extent even at a straight portion. The connection pipe 80 has the protector 85 on the side close to the tank main body TB.

Figure 35:
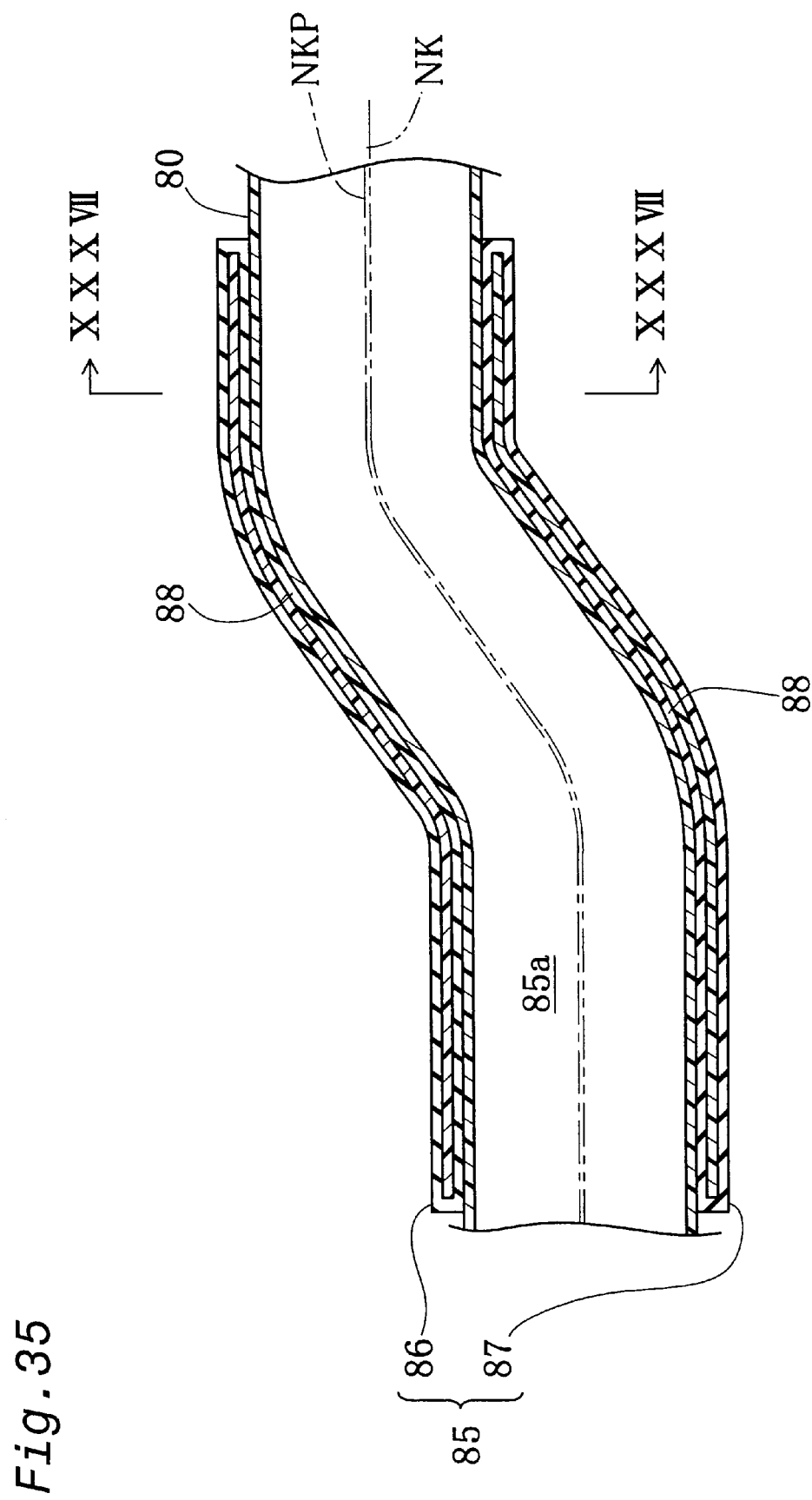
FIG. 35 is a sectional view schematically illustrating a protector disposed along a fuel conduit in the fuel feeding mechanism of FIG. 34.
Figure 36:
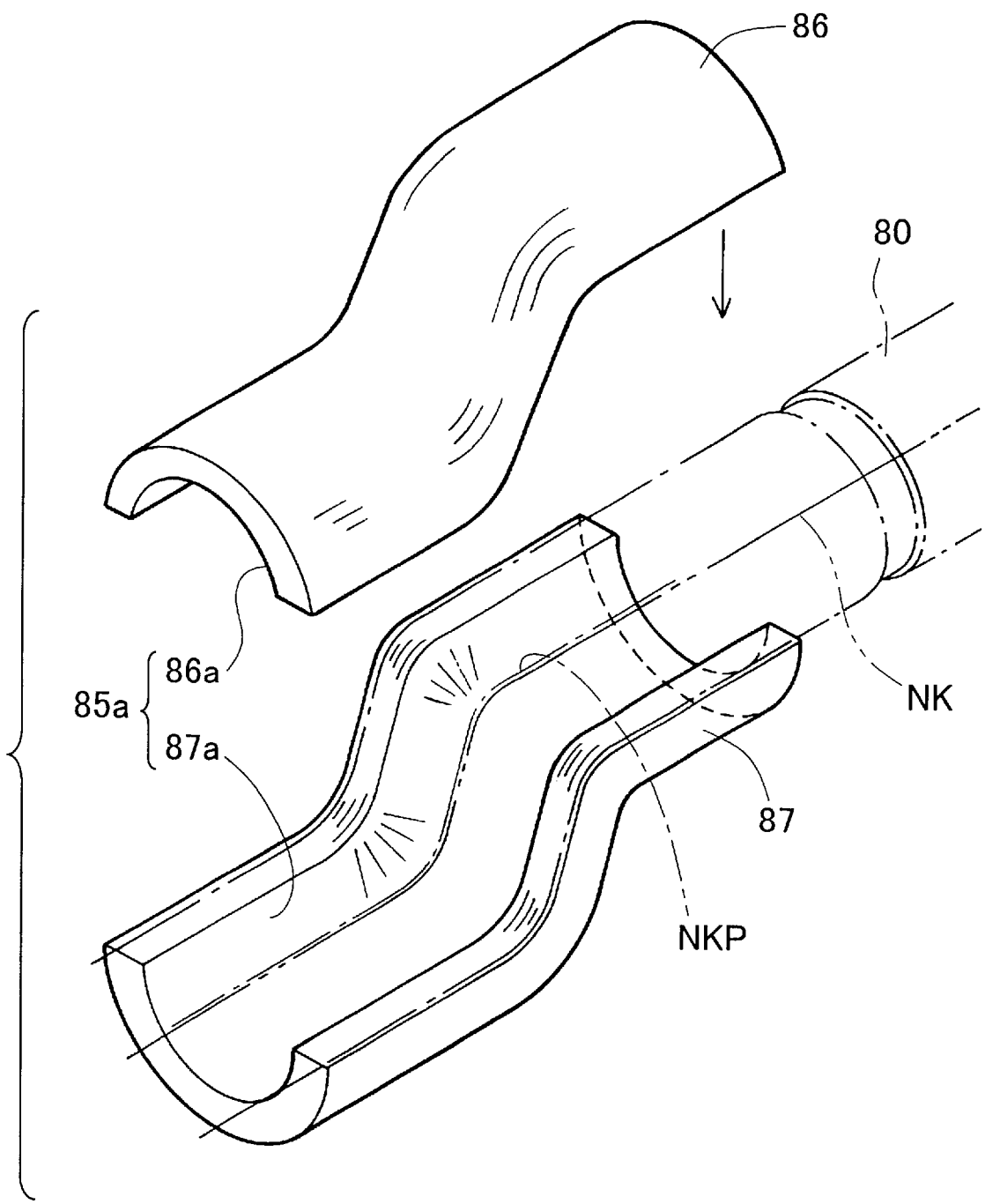
FIG. 36 is a decomposed perspective view schematically illustrating the structure of the protector.
Figure 37:
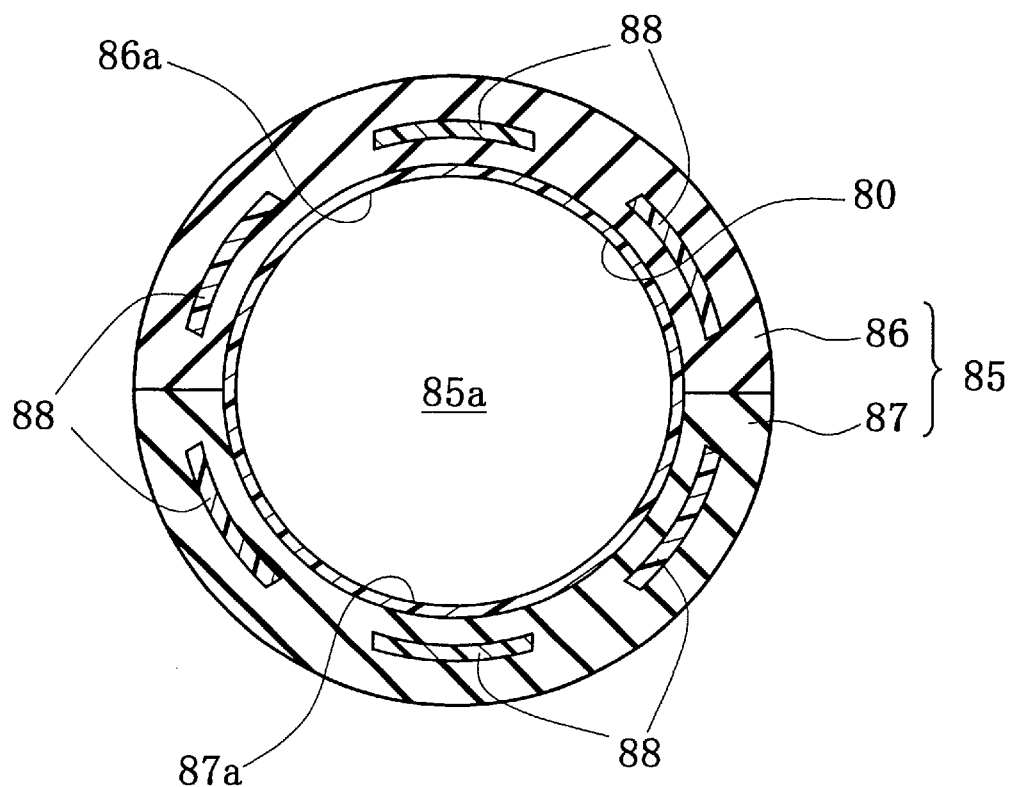
FIG. 37 is a sectional view of the protector, taken on the line XXXVIII—XXXVIII in FIG. 35.

FIG. 35 is a sectional view schematically illustrating the protector 85 disposed along a fuel pathway in the fuel feeding mechanism of FIG. 34. FIG. 36 is a decomposed perspective view schematically illustrating the structure of the protector 85. FIG. 37 is a sectional view of the protector 85, taken on the line XXXVII—XXXVII in FIG. 35. The protector 85 has a certain shape in order to define a curved locus NKP at a portion of a fuel pathway NK formed by the connection pipe 80 and to support the connection pipe 80 along the curved locus NKP. The protector 85 includes an upper protector section 86 and a lower protector section 87, which are joined to each other across the parting line, and defines a curved path 85a for receiving the connection pipe 80 inside thereof. The partition line is substantially coincident with an axial line of the curved path 85a, that is, the curved locus NKP that is included in the fuel pathway NK of the connection pipe 80 and defined by the protector 85.

Both the upper protector section 86 and the lower protector section 87 are molded substances of an EPDM rubber material. A plurality of core members 88 are embedded for shape-maintaining purpose at an intervals in both the upper protector section 86 and the lower protector section 87. The upper protector section 86 defines an upper half groove 86a, whereas the lower protector section 87 defines a lower half groove 87a. The joint of the upper protector section 86 with the lower protector section 87 causes the upper half groove 86a and the lower half groove 87a to be joined together and form the curved path 85a. The curved locus NKP of the curved path 85a is determined at the design stage by taking into account the positional relationship between the filler opening 22 of the fuel inlet unit FI and the tank main body TB. More concretely, the curved locus NKP is determined by taking into account the degree of upward, downward, leftward, or rightward positional misalignment of the tank main body TB relative to the filler opening 22 so that the curved locus NKP does not interfere with any constituents of the vehicle body (not shown) that are placed in the vicinity of the tank main body TB. The outer diameter of the protector 85 should be smaller than the inner diameter of the opening 32 of the outer wheel house 30 described above. This arrangement enables the connection pipe 80 with the protector 85 mounted thereon to be inserted into the opening 32 of the outer wheel house 30 from the outside of the vehicle.

The upper protector section 86 and the lower protector section 87 may be provided by an appropriate technique, for example, insertion molding. The plurality of core members 88, which are bent along the curved locus NKP determined in the above manner, are located in advance in a mold, and the EPDM rubber material is injected into the cavity of the mold. The upper half groove 86a and the lower half groove 87a are formed to be bent along the curved locus NKP and form the curved path 85a having a little larger diameter than the outer diameter of the connection pipe 80. Another applicable procedure forms a cylindrical body, which is bent along the curved locus NKP and includes the plurality of core members 88 embedded therein, by insertion molding and parts the cylindrical body into an upper half section and a lower half section across the curved locus NKP as the parting line to make the upper protector section 86 and the lower protector section 87.

Figure 38:
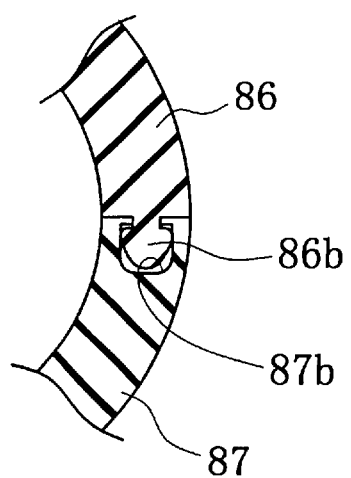
FIG. 38 shows attachment of an upper protector section to a lower protector section in the protector of FIG. 35.

The protector 85 is attached to the connection pipe 80 according to the following procedure. The procedure first positions and presses the connection pipe 80, which is adequately bent, into one of the half grooves of the protector sections, for example, into the lower half groove 87a of the lower protector section 87. The upper protector section 86 is then joined with and attached to the lower protector section 87 that supports the connection pipe 80 therein. This causes the protector 85 to be mounted on the connection pipe 80. A belt or a band (not shown) may be used to attach the upper protector section 86 to the lower protector section 87. Another attachment or fixation means may be applied for the same purpose. In one example, an anchor projection 86b formed on the upper protector section 86 fits in a fixation recess 87b formed on the joint surface of the lower protector section 87, as shown in FIG. 38.

In the sub-assembled fuel feeding mechanism FS after mounting the protector 85 and attaching the check valve 90, the protector 85 causes the fuel pathway NK of the connection pipe 80 to be along the curved locus NKP defined by the shape of the protector 85. The protector 85 mounted on the connection pipe 80 supports the connection pipe 80 to keep the fuel pathway NK thereof along the curved locus NKP.

The curved locus NKP defined by the shape of the protector 85 depends upon the positional relationship between the filler opening 22 and the tank main body TB. The simple mounting of the protector 85 on the connection pipe 80 completes the fuel pathway NK along the curved locus NKP according to the positional relationship between the filler opening 22 and the tank main body TB. This arrangement does not require any special skills for the attachment of the fuel feeding mechanism FS to the vehicle and facilitates the attachment. The protector 85 also protects the connection pipe 80 from a possible external shock.

The protector 85 is made of the EPDM rubber having the flame resistance so that the protector 85 protects the connection pipe 80 from possible flames.

Figure 39:
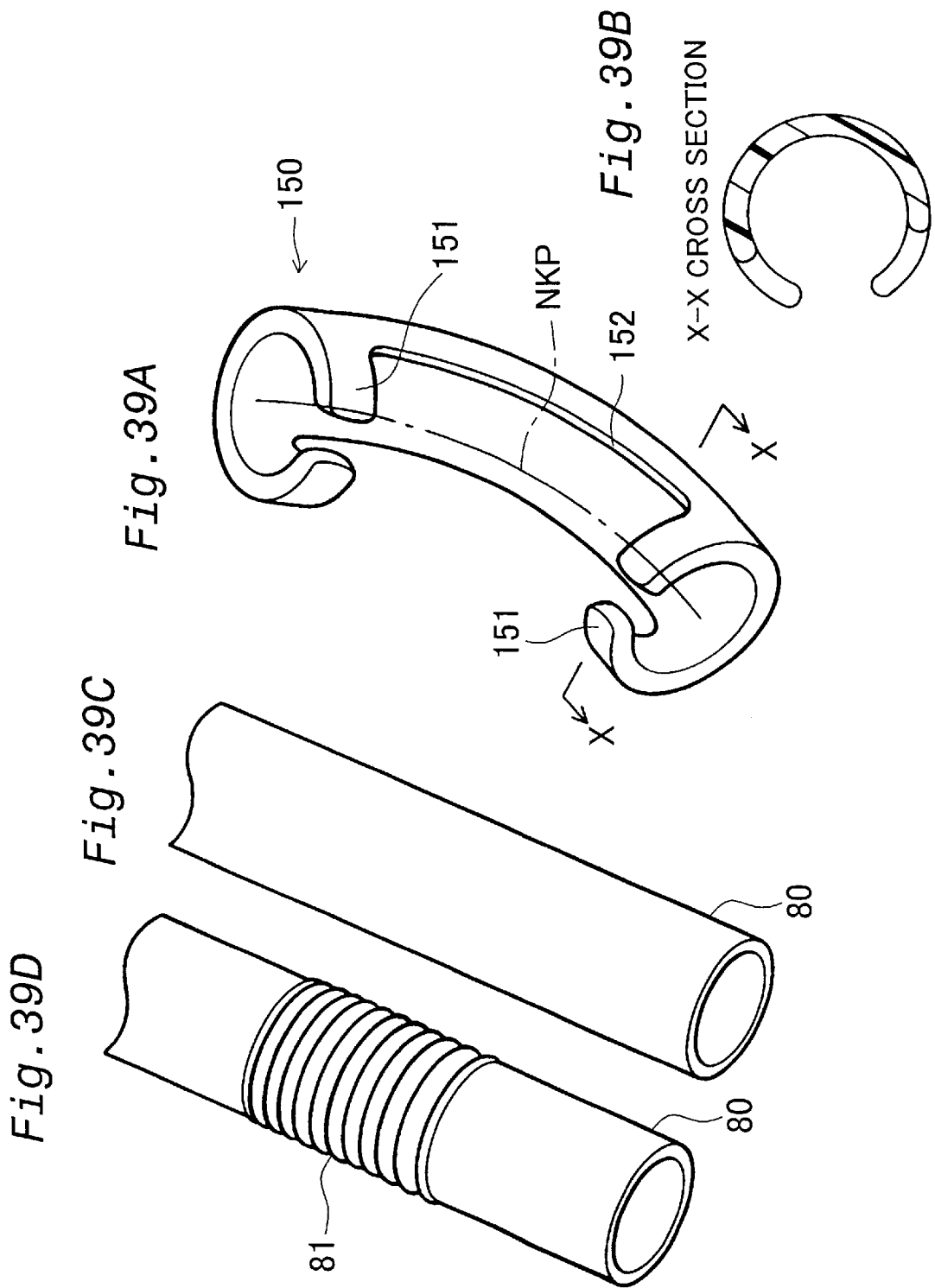
FIGS. 39A–39D show another protector as a modification of the third embodiment.

The following describes another variation of the protector. FIG. 39 is a perspective view illustrating a protector 150. The protector 150 has a pair of C-shaped support members 151 on the respective ends thereof and a bridge 152 connecting the pair of support members 151 with each other. The bridge 152 is bent along a curved locus NKP, and the pair of support members 151 are located at the respective ends of the curved locus NKP. The bridge 152 is designed to have a substantially semicircular cross section (see FIG. 39B). In the state where the respective support members 151 are pressed open, the connection pipe 80 is pressed into the cavity of the protector 150. This arrangement enables the connection pipe 80 (shown in FIG. 39C) to be bent and held along the curved locus NKP.

Like the protector 85 of the third embodiment discussed above, the protector 150 of the modified structure facilitates the attachment of fuel feeding mechanism FS to the vehicle. A connection pipe 80 having the bellows 81 at the place of mounting the protector 150 enables the curved shape of the connection pipe 80 to be kept more readily, as shown in FIG. 39D.

In addition to the above modified structure, other modifications, changes, and alterations are also possible without departing from the scope or spirit of the main characteristics of the present invention. Some examples of such modification are discussed below.

In the third embodiment discussed above, the protector 85 is equally parted into the upper half section 86 and the lower half section 87. The protector may, however, be divided into upper and lower sections at any ratio in the range of 2/3 to 1/3. The protector divided into the upper and lower sections at the ratio of 2/3 desirably has improved shape-keeping properties when the protector is mounted on the connection pipe.

Figure 40:
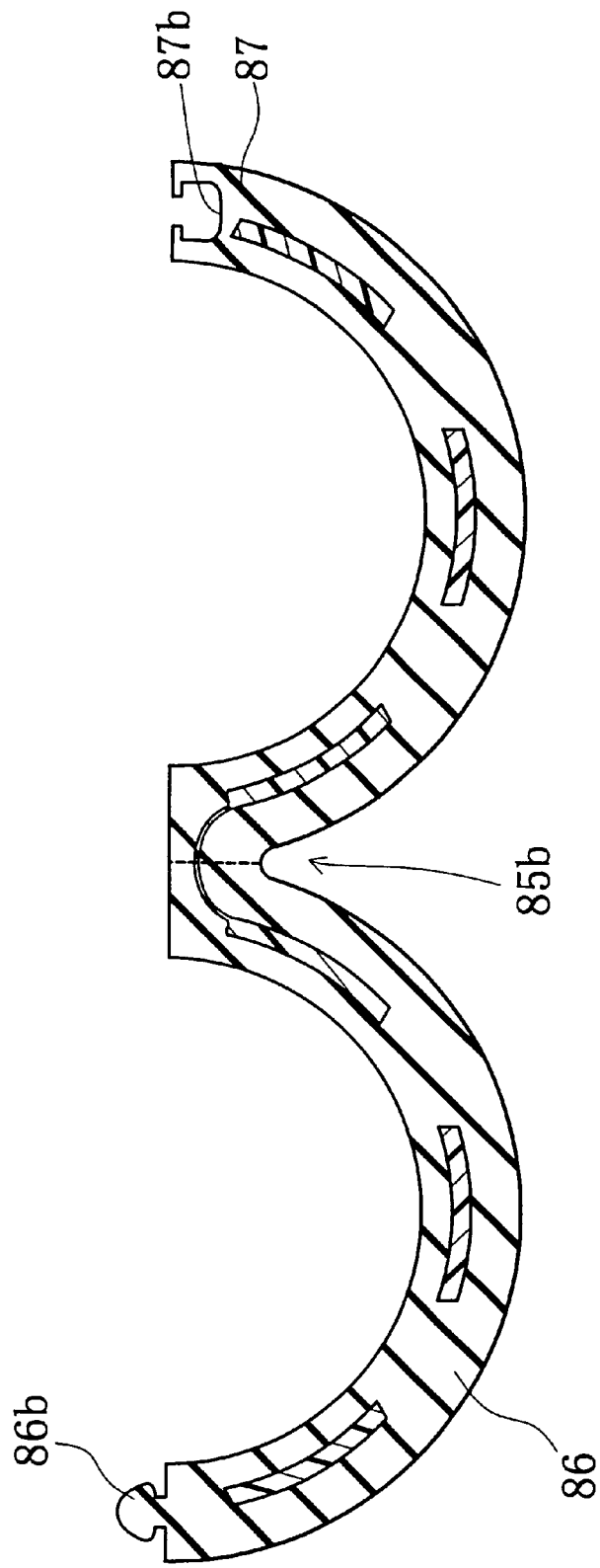
FIG. 40 shows another protector as another modification of the third embodiment.
Figure 41:
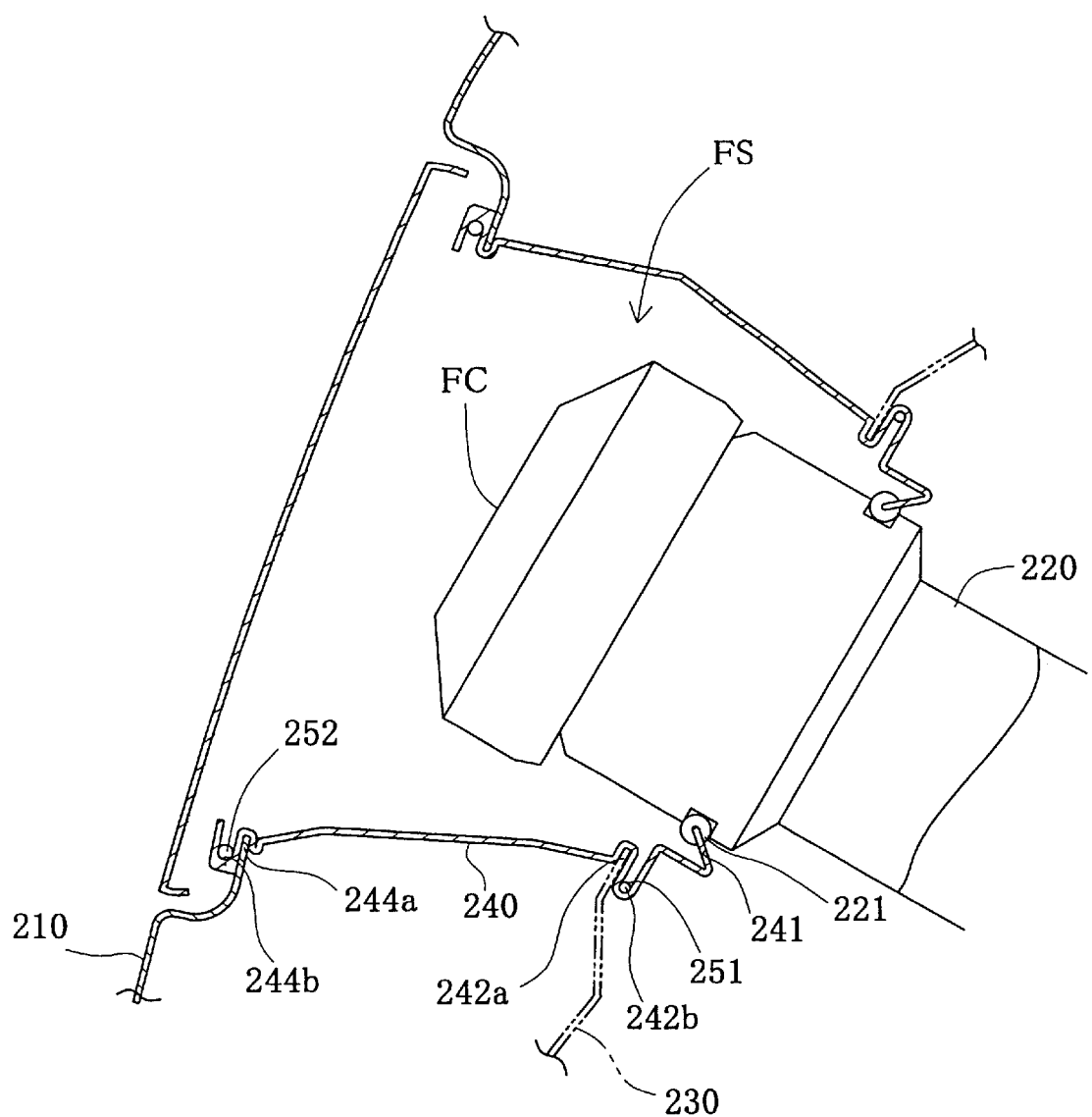
FIG. 41 shows a prior art fuel feeding mechanism for feeding a supply of fuel into a fuel tank of an automobile.

Another modification provides the upper protector section 86 and the lower protector section 87 integrally formed together via a joint 85b, as shown in FIG. 40. In this modified structure, the fixation recess 87b is formed on the joint face of the lower protector section 87 and the anchor projection 86b, which is to fit in the fixation recess 87b, is formed on the upper protector section 86, as discussed above with FIG. 38. The upper protector section 86 is folded over the lower protector section 87 around the joint 85b in order to complete the mounting of the protector 85 to the connection pipe 80. The anchor projection 86b fits in the fixation recess 87b so that the upper protector section 86 is completely integrated with the lower protector section 87.

The integral upper and lower protector sections of this modified structure facilitates the management of parts. This modified structure does not require the positioning of the anchor projection 86b at the fixation recess 87b in the course of the joint of the upper protector section 86 with the lower protector section 87, thereby improving the workability.

The protector is divided into upper and lower sections in the third embodiment and its modifications discussed above. The dividing direction may, however, be determined adequately by taking into account the formability and the workability, with the provision that the partition is carried out along the curved locus NKP. For example, the protector may be divided into left and right sections.

The scope and spirit of the present invention are limited only by the terms of the appended claims.

What is claimed is:

1. A fuel feeding apparatus that connects a filler opening arranged in an outside plate of a vehicle and a tank main body of a fuel tank and leads a supply of fuel to said tank main body, said fuel feeding apparatus comprising:

an inlet filler pipe, said inlet filler pipe comprising:

a pipe main body inserted from outside of said vehicle through said filler opening towards said tank main body, and a pipe attachment secured to said pipe main body, said pipe attachment detachably attached to a body attachment member disposed inside said outside plate with a predetermined space from said tank main body.

2. The fuel feeding apparatus as claimed in claim 1, said fuel feeding apparatus further comprising:

a seal cup having an opening and a cup bottom, wherein said opening of said seal cup is attached to said outside plate of said vehicle to surround said filler opening and said cup bottom of said seal cup has a hole through which said inlet filler pipe passes, wherein a peripheral part of said cup bottom of said seal cup is held between said body attachment member and said pipe attachment to be attached to said body attachment member.

3. The fuel feeding apparatus as claimed in claim 2, said fuel feeding apparatus further comprising a protection plate that is made of spongy and is disposed between said bottom of said seal cup and said pipe attachment.

4. The fuel feeding apparatus as claimed in claim 1, wherein said pipe attachment has an elastic clip to be linked with said body attachment member.

5. The fuel feeding apparatus as claimed in claim 4, wherein said clip is released to prevent a part of said inlet filler pipe from being broken when a load of not less than a predetermined level is applied to separate said pipe attachment from said body attachment member.

6. The fuel feeding apparatus as claimed in claim 1, wherein said pipe attachment has an engagement element rotated at a predetermined angle relative to said body attachment member to be attached to said body attachment member.

7. The fuel feeding apparatus as claimed in claim 1, wherein said inlet filler pipe has a volume resistivity low enough to enable conduction of electricity and is connected ground.

8. The fuel feeding apparatus as claimed in claim 7, wherein said inlet filler pipe includes of a conductive material having a volume resistivity of at most $10^{11}$ Ω·cm.

9. The fuel feeding apparatus as claimed in claim 1, wherein said inlet filler pipe has a curved portion;

said fuel feeding apparatus further comprising:
a support member attached to said curved portion of said inlet filler pipe from outside said inlet filler pipe and shapes to fit said curved portion to support said curved portion of said inlet filler pipe along said curved portion.

10. The fuel feeding apparatus as claimed in claim 9, wherein said support member protects said curved portion from an external force.

11. The fuel feeding apparatus as claimed in claim 10, wherein said support member is splittable along a longitudinal axis of said inlet filler pipe.

12. The fuel feeding apparatus as claimed in claim 10, wherein said support member is made of a flame-proof material.

13. A fuel feeding apparatus as claimed in claim 1, said fuel feeding apparatus further comprising:

a check valve attached to an end of said inlet filler pipe on said side of said tank main body of said fuel tank, said check valve having a casing with a flow inlet connecting said inlet filler pipe and a discharge outlet, and a valve disc for opening said discharge outlet when sufficient fuel pressure is applied to said valve disk from said inlet filler pipe.

14. The fuel feeding apparatus as claimed in claim 13, wherein said inlet filler pipe and said casing of said check valve are integrally formed of a resin.

15. The fuel feeding apparatus as claimed in claim 13, wherein said casing of said check valve comprises a valve attachment attached to said tank main body from outside of said tank main body.

16. The fuel feeding apparatus as claimed in claim 15, wherein a seal is mounted on said casing of said check valve, wherein said seal seals said check valve to said tank main body of said fuel tank when said check valve is attached to said tank main body.

17. The fuel feeding apparatus as claimed in claim 15, wherein said casing of said check valve comprises a first casing section and a second casing section, said first and second casing sections being separate elements capable of being secured to each other, and wherein said valve attachment is arranged on said first casing section and said valve disc being arranged on said second casing section.

* * * * *